United States Patent
Rapaka et al.

(10) Patent No.: US 9,936,207 B2
(45) Date of Patent: Apr. 3, 2018

(54) INDICATION OF PARALLEL PROCESSING IN VIDEO CODING

(71) Applicant: QUALCOMM Incorporated, San Diego, CA (US)

(72) Inventors: Krishnakanth Rapaka, San Diego, CA (US); Ye-Kui Wang, San Diego, CA (US); Fnu Hendry, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 681 days.

(21) Appl. No.: 14/512,199

(22) Filed: Oct. 10, 2014

(65) Prior Publication Data

US 2015/0103920 A1  Apr. 16, 2015

Related U.S. Application Data

(60) Provisional application No. 61/890,763, filed on Oct. 14, 2013.

(51) Int. Cl.
| | |
|---|---|
| *H04N 7/12* | (2006.01) |
| *H04N 19/37* | (2014.01) |
| *H04N 19/70* | (2014.01) |
| *H04N 19/91* | (2014.01) |
| *H04N 19/436* | (2014.01) |
| *H04N 19/30* | (2014.01) |

(52) U.S. Cl.
CPC ............. *H04N 19/37* (2014.11); *H04N 19/30* (2014.11); *H04N 19/436* (2014.11); *H04N 19/70* (2014.11); *H04N 19/91* (2014.11)

(58) Field of Classification Search
CPC ...... H04N 19/37; H04N 19/30; H04N 19/436; H04N 19/70; H04N 19/91
USPC ..................................................... 375/240.26
See application file for complete search history.

(56) References Cited

U.S. PATENT DOCUMENTS

| | | | | |
|---|---|---|---|---|
| 2013/0117379 A1* | 5/2013 | Kahn | ....................... | H04N 7/20 709/205 |
| 2015/0016543 A1 | 1/2015 | Rapaka et al. | | |

OTHER PUBLICATIONS

Deshpande et al., "On Tile Alignment", JCT-VC Meeting;Vienna; Jul. 25-Aug. 2, 2013; (Joint Collaborative Team on Video Coding of ISO/IEC JTC1/SC29/WG11 and ITU-T SG.16), No. JCTVC-M0199-V3, Jul. 31, 2013, XP030114695, pp. 1-7.*

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

(Continued)

*Primary Examiner* — Allen Wong
(74) *Attorney, Agent, or Firm* — Shumaker & Sieffert, P.A.

(57) ABSTRACT

In an example, a method of decoding video data includes decoding, from a video parameter set (VPS) of a multi-layer bitstream, data that indicates at least one of a tile configuration for layers of the multi-layer bitstream or a parallel processing configuration for layers of the multi-layer bitstream. The method also includes decoding the multi-layer bitstream in accordance with the data decoded from the VPS.

44 Claims, 11 Drawing Sheets

(56) References Cited

OTHER PUBLICATIONS

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14 through 22, 2011, (Joint Collaborative Team on Video Coding of ISO/IEC JTC1/SC29/WG11 and ITU-T SG.16); JCTVC-F803_d2, Oct. 4, 2011, 226 pp.

Bross et al., "WD5: Working Draft 5 of High-Efficiency Video Coding," 7th Meeting: Geneva, Switzerland, Nov. 21 through 30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1 through 10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27 through May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11 through 20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10 through 19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High efficiency video coding (HEVC) text specification draft 10 (for FDIS & Last Call)," 12th Meeting: Geneva, CH, Jan. 14 through 23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Deshpande. et al., "On Tile Alignment", JCT-VC Meeting;Vienna; Jul. 25-Aug. 2, 2013; (Joint Collaborative Team on Video Coding of ISO/IEC JTC1/SC29/WG11 and ITU-T SG.16), No. JCTVC-N0199-v3, Jul. 31, 2013, XP030114695, 7 pp.

Rapaka, et al., "MV-HEVC/SHVC HLS: On early indication of parallel processing tools in HEVC extensions", JCT-3V Meeting; Oct. 23-Nov. 1, 2013; Geneva; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-F0081, Oct. 15, 2013, XP030131489, 2 pp.

Tech, et al., "MV-HEVC Draft Text 5," Jul. 27-Aug. 2, 2013; (The Joint Collaborative Team on 3D Video Coding Extension Development of ISO/IEC JTC1/SC29/WG11 and ITU-T SG.16); Document: JCT3V-E1004_v6, Aug. 7, 2013, 65 pp.

Wang, et al., "High Efficiency Video Coding (HEVC) Defect Report," Jul. 25-Aug. 2, 2013; (The Joint Collaborative Team on 3D Video Coding Extension Development of ISO/IEC JTC1/SC29/WG11 and ITU-T SG.16); Sep. 27, 2013; Document: JCTVC-N1003_v1, 311 pp.

Chen, et al., "High efficiency video coding (HEVC) scalable extension draft 3," Jul. 25-Aug. 2, 2013; (The Joint Collaborative Team on 3D Video Coding Extension Development of ISO/IEC JTC1/SC29/WG11 and ITU-T SG.16); Document: JCTVC-N1008_v3, Sep. 16, 2013, 68 pp.

Flynn, et al., "High Efficiency Video Coding (HEVC) Range Extensions text specification: Draft 4," Apr. 18-26, 2013; (The Joint Collaborative Team on 3D Video Coding Extension Development of ISO/IEC JTC1/SC29/WG11 and ITU-T SG.16); Aug. 8, 2013; Document: JCTVC-N1005_v1, 332 pp.

International Search Report and Written Opinion from International Application No. PCT/US2014/060445, dated Feb. 3, 2015, 11 pp.

Response to Written Opinion dated Feb. 3, 2015, from International Application No. PCT/US2014/060445, filed on Aug. 14, 2015, 4 pp.

Second Written Opinion from International Application No. PCT/US2014/060445, dated Oct. 1, 2015, 5 pp.

Response to Second Written Opinion dated Oct. 1, 2015, from International Application No. PCT/US2014/060445, filed on Dec. 1, 2015, 22 pp.

International Preliminary Report on Patentability from International Application No. PCT/US2014/060445, dated Jan. 20, 2016, 6 pp.

Chen, et al., "SHVC Test Model 2 (SHM 2)," Apr. 18-26, 2013, Joint Collaborative Team on 3D Video Coding Extension Development of ITU-T SG 16 WP 3 and ISO/IEC JTC 1/Sc 29/WG 11; Document: JCTVC-M1007_v1, Jun. 6, 2013, 45 pp.

Chen, et al., "SHVC Draft Text 1", Jan. 14-23, 2013, Joint Collaborative Team on Video Coding (JCT-VC) of ITU-T SG16 WP3 and ISO/IEC JTC1/SC29/WG11, 12th Meeting: Geneva, CH, JCTVC-L1008, Mar. 20, 2013, 34 pp.

Wan, et al., "Adding a Level Restriction on Coding Tree Block Size," Jul. 11-20, 2012, Joint Collaborative Team on 3D Video Coding Extension Development of ITU-T SG 16 WP 3 and ISO/IEC JTC 1/SC 29/WG 11, Document: JCTVC-J0334, Jul. 2, 2012, 3 pp.

Rapaka, et al., "MV-HEVC/SHVC HLS: Bitstream restrictions on tiles and wavefonts across layers," JCT-3V Meeting; Jul. 25-Aug. 2, 2013; Vienna; (Joint Collaborative Team on 3D Video Coding Extension Development of ISO/IEC JTC1/SC29/WG11 and ITU-T SG.16); URL: http://phenix.int-evry.fr/jct2/, No. JCT3V-E0070, Jul. 16, 2013 XP030131073, 4 pp.

Sullivan, "The Arrival of the High Efficiency Video Coding Standard (HEVC)", Data Compression Conference, DCC 2013, Mar. 20, 2013, XP055149924, Snowbird, UT, USA, Retrieved from the Internet: URL:http://www.cs.brandeis.edu/~dcc/Programs/Program2013InvitedPresentation.pdf., retrieved on Oct. 30, 2014, 7 pp.

Sullivan, et al., "Overview of the High Efficiency Video Coding (HEVC) Standard," IEEE Transactions on Circuits and Systems for Video Technology, IEEE Service Center, Piscataway, NJ, US, vol. 22, No. 12, Dec. 1, 2012, XP011487803, pp. 1649-1668, ISSN: 1051-8215, DOI: 10.1109/TCSVT.2012.2221191.

Tech, et al., "3D-HEVC Test Model 4", JCT-3V Meeting; Incheon; (The Joint Collaborative Team on 3D Video Coding Extension Development of ISO/IEC JTC1/SC29/WG11 and ITU-T SG.16), No. JCT3V-D1005, Jun. 17, 2013, 88 pp., XP030130998.

Tech, et al., "MV-HEVC Draft Text 3 (ISO/IEC 23008-2:201x/PDAM2)", Joint Collaborative Team on 3D Video Coding Extension Development of ITU-T SG 16 WP 3 and ISO/IEC JTC 1/SC 29/WG 11, 3rd Meeting: Geneva, CH, JCT3V-C1004_d3, Jan. 17-23, 2013, 38 pp.

Tech, et al., "MV-HEVC Draft Text 4-JCT3V-D1004 v4", Joint Collaborative Team on 3D Video Coding Extension Development of ITU-T SG 16 WP 3 and ISO/IEC JTC 1/SC 29/WG 11 4th Meeting: Incheon, vol. JCT3V-D1004 v4, Jun. 17, 2013, XP055141490, 62 pp.

Tech, et al., "MV-HEVC Draft Text 3 (ISO/IEC 23008-2:201x/PDAM2)", Joint Collaborative Team on 3D Video Coding Exten-

(56) References Cited

OTHER PUBLICATIONS sion Development of ITU-T SG 16 WP 3 and ISO/IEC JTC 1/SC 29/WG 11, 3rd Meeting: Geneva, CH, JCT3V-C1004_d3, Jan. 17-23, 2013; 34 pp.

Bross, et al., "Editors' Proposed Corrections to HEVC version 1," Joint Collaborative Team on Video Coding (JCT-VC) of ITU-T SG16 WP3 and ISO/IEC JTC1/SC29/WG11, 13th Meeting, Incheon, KR, Apr. 2013, 309 pp.

Tech, et al., "3D-HEVC Draft Text 1," JCT Meeting; Jul. 27-Aug. 2, 2013; Joint Collaborative Team on Video Coding (JCT-VC) of ITU-T SG16 WP3 and ISO/IEC JTC1/SC29/WG11, 5th Meeting; No. JCT3V-E1001_v3, Sep. 11, 2013; 89 pp.

* cited by examiner

|   A   |   B   |   C   |   D   |   E   |   F   |   G   |
|-------|-------|-------|-------|-------|-------|-------|
| CTB 0 ROW 0 | CTB 1 ROW 0 | CTB 2 ROW 0 | CTB 3 ROW 0 | CTB 4 ROW 0 | CTB 5 ROW 0 | CTB 6 ROW 0 |
| CTB 0 ROW 1 | CTB 1 ROW 1 | CTB 2 ROW 1 | CTB 3 ROW 1 | CTB 4 ROW 1 | CTB 5 ROW 1 | CTB 6 ROW 1 |
|   A   |   B   |   C   |   D   |   E   |   F   |   G   |

FIG. 4A

|   A   |   B   |   C   |   D   |   E   |   F   |
|-------|-------|-------|-------|-------|-------|
| CTB 0 ROW 0 | CTB 1 ROW 0 | CTB 2 ROW 0 | CTB 3 ROW 0 | CTB 4 ROW 0 | CTB 5 ROW 0 | CTB 6 ROW 0 |
| CTB 0 ROW 1 | CTB 1 ROW 1 | CTB 2 ROW 1 | CTB 3 ROW 1 | CTB 4 ROW 1 | CTB 5 ROW 1 | CTB 6 ROW 1 |
|   A   |   B   |   C   |   D   |   E   |   F   |

| CTB 0 ROW 0 | CTB 1 ROW 0 | CTB 2 ROW 0 | CTB 3 ROW 0 | CTB 4 ROW 0 | CTB 5 ROW 0 | CTB 6 ROW 0 |
|-------------|-------------|-------------|-------------|-------------|-------------|-------------|
| CTB 0 ROW 1 | CTB 1 ROW 1 | CTB 2 ROW 1 | CTB 3 ROW 1 | CTB 4 ROW 1 | CTB 5 ROW 1 | CTB 6 ROW 1 |
| CTB 0 ROW 2 | CTB 1 ROW 2 | B' CTB 2 ROW 2 | CTB 3 ROW 2 | CTB 4 ROW 2 | CTB 5 ROW 2 | CTB 6 ROW 2 |
| CTB 0 ROW 3 | CTB 1 ROW 3 | CTB 2 ROW 3 | CTB 3 ROW 3 | CTB 4 ROW 3 | CTB 5 ROW 3 | CTB 6 ROW 3 |

INDICATION OF PARALLEL PROCESSING IN VIDEO CODING

This application claims the benefit of U.S. Provisional Application No. 61/890,763, filed Oct. 14, 2013, the entire contents of which are incorporated by reference herein.

TECHNICAL FIELD

This disclosure relates to video coding, and more particularly to techniques for parallel processing in video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as CTBs, CUs, and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for parallel processing of video coding. For example, this disclosure describes techniques for parallel processing in multi-layer video coding processes, including multi-layer extensions of the High Efficiency Video Coding (HEVC) standard. The techniques of this disclosure include providing an early indication of use or availability of parallel processing tools (e.g., at a video parameter set (VPS) level) for a video coding process.

In an example, a method of decoding video data includes decoding, from a video parameter set (VPS) of a multi-layer bitstream, data that indicates at least one of a tile configuration for layers of the multi-layer bitstream or a parallel processing configuration for layers of the multi-layer bitstream, and decoding the multi-layer bitstream in accordance with the data decoded from the VPS.

In another example, a method of encoding video data includes encoding, in a video parameter set (VPS) of a multi-layer bitstream, data that indicates at least one of a tile configuration for layers of the multi-layer bitstream or a parallel processing configuration for layers of the multi-layer bitstream, and encoding the multi-layer bitstream including encoding the VPS of the multi-layer bitstream.

In another example, an apparatus that processes video data includes a memory storing multi-layer video data, and a video coder configured to process data that indicates at least one of a tile configuration for layers of the multi-layer video data or a parallel processing configuration for layers of the multi-layer video data, wherein the data is associated with a video parameter set (VPS) of a bitstream that includes the multi-layer video data, and process the multi-layer video data in accordance with the data of the VPS.

In another example, an apparatus that performs video data includes means for processing data that indicates at least one of a tile configuration for layers of the multi-layer bitstream or a parallel processing configuration for layers of the multi-layer bitstream, wherein the data is associated with a video parameter set (VPS) of the multi-layer bitstream, and means for processing the multi-layer bitstream in accordance with the data of the VPS.

In another example, a non-transitory computer-readable storage medium has instructions stored thereon that, when executed, cause one or more processors to process data that indicates at least one of a tile configuration for layers of the multi-layer bitstream or a parallel processing configuration for layers of the multi-layer bitstream, wherein the data is associated with a video parameter set (VPS) of the multi-layer bitstream, and process the multi-layer bitstream in accordance with the data of the VPS.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4A is conceptual diagram illustrating an example of synchronization points for wavefront parallel processing.

FIG. 4B is conceptual diagram illustrating another example of synchronization points for wavefront parallel processing.

FIG. 5 is a conceptual diagram illustrating example synchronization points for parallel processing of video block rows.

FIG. 6 is a conceptual diagram illustrating example tiles in accordance with the HEVC standard.

DETAILED DESCRIPTION

Figure 1:
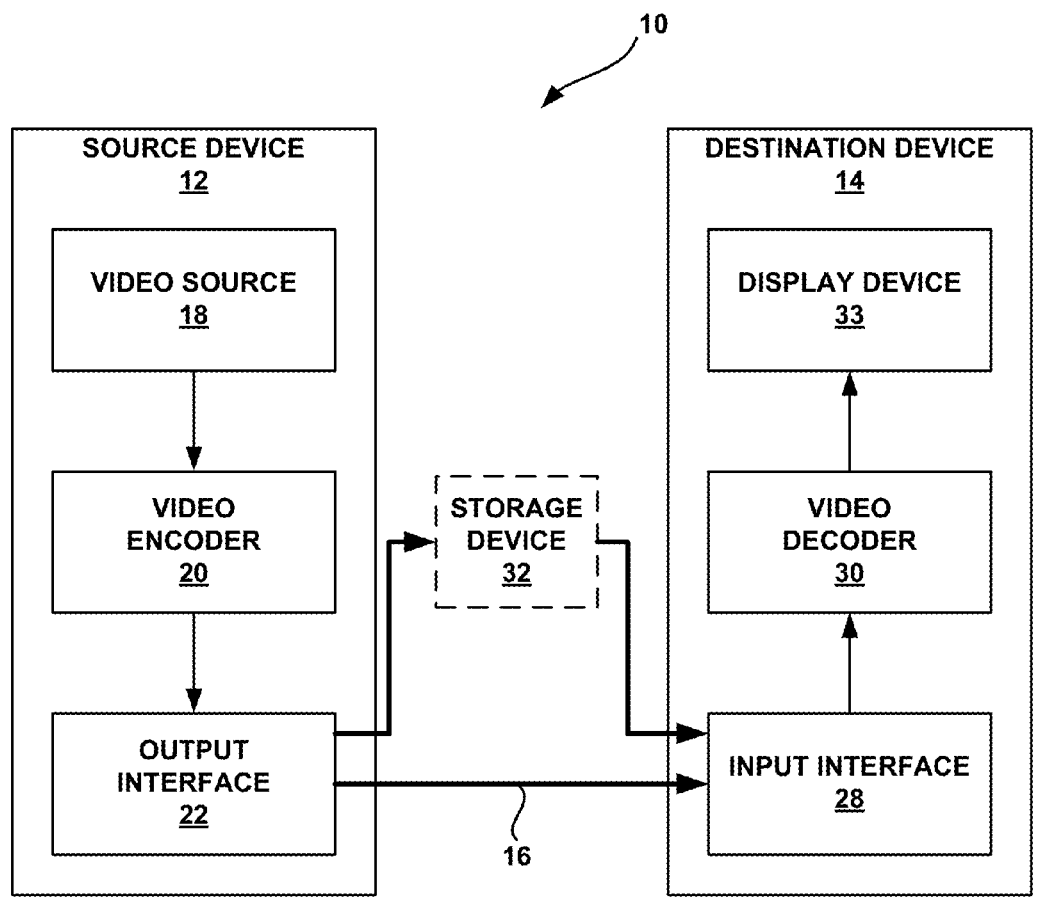
FIG. 1 is a block diagram illustrating an example video encoding and decoding system that may utilize the techniques described in this disclosure.

Aspects of this disclosure may relate to various techniques for early indication of parallel processing tools in video coding, as described in greater detail below. In some instances, the techniques may be performed with multi-layer extensions to a High Efficiency Video Coding (HEVC) standard such as a Multi-view Video Coding extension to HEVC (MV-HEVC), a Multi-view plus depth Video Coding extension to HEVC (3D-HEVC), or a Scalable Video Coding (SVC) extension to HEVC (SHVC), as noted below. The techniques of this disclosure, however, are not limited to any particular video coding standard, and may also or alternatively be used with other extensions to HEVC, other multi-view coding standards (with or without a depth component) and/or other multi-layer video standards. In addition, techniques of this disclosure, as described below, may be applied independently or in combination.

Parallel processing tools may be used to encode or decode video data in parallel. For example, some parallel processing tools may allow different spatial portions of a single video picture to be encoded or decoded in parallel. In an example for purposes of illustration, with respect to the HEVC standard noted above, parallel processing may be achieved using wavefront parallel processing (WPP). WPP is a video coding technique whereby two or more rows of video blocks (e.g., coded tree block (CTB) rows, as described below) are encoded and/or decoded at approximately the same time (i.e., in parallel).

Due to inter-dependencies in intra-prediction, inter-prediction, and certain syntax element parsing, using WPP, parallel decoding of the rows of blocks may be synchronized. That is, video blocks in a current row of blocks may use coded information from video blocks in a row of blocks above the current row of blocks. When processing two rows of blocks in parallel, a video decoder may synchronize processing between blocks in the two rows to ensure that data required by a lower row of blocks has already been coded in the upper row of blocks. In this regard, the WPP process may be considered to be split into two main processes including a bitstream parsing process and a reconstruction process. The reconstruction process may include synchronization between rows of blocks.

Another parallel processing technique includes using so-called tiles for coding video. For example, HEVC defines tiles as an integer number of blocks co-occurring in one column and one row, ordered consecutively in a raster scan of the tile. The division of each picture into tiles may be referred to as a partitioning. Tiles in a picture are ordered consecutively in the tile raster scan of the picture. The number of tiles and the locations of their boundaries may be defined for the entire sequence or changed from picture to picture. Tile boundaries, similarly to slice boundaries, break parsing and prediction dependences so that a tile can be processed independently of another tile. However, in some instances, in-loop filters (e.g., de-blocking and sample adaptive offset (SAO) filters) may still cross tile boundaries.

Using tiles may enhance parallelism, because no (or relatively little) communication is needed between processors or processor cores for entropy decoding and motion compensation reconstruction. Accordingly, different tiles of a picture may be processed by different processors or processor cores. In addition, tiles may exhibit a relatively better coding efficiency when compared to slices, because tiles allow picture partition shapes that contain samples with potentially higher correlation than slices. Tiles may also reduce slice header overhead.

While the WPP and tile techniques described above may provide for parallel processing within a particular layer, in some instances, multiple layers of video data may also be encoded or decoded in parallel. A "layer" of video data may generally refer to a sequence of pictures having at least one common characteristic, such as a view, a frame rate, a resolution, or the like. For example, a layer may include video data associated with a particular view (e.g., perspective) of multi-view video data (as described, for example, with respect to FIG. 7 below). As another example, a layer may include video data associated with a particular layer of scalable video data (as described, for example, with respect to FIGS. 8-10 below). Thus, this disclosure may interchangeably refer to a layer and a view of video data. That is, a view of video data may be referred to as a layer of video data, and vice versa. Moreover, the terms inter-view prediction and inter-layer prediction may interchangeably refer to prediction between multiple layers and/or views of video data. In addition, a multi-layer codec (also referred to as a multi-layer video coder or multi-layer encoder-decoder) may jointly refer to a multiview codec or a scalable codec (e.g., a codec configured to encode and/or decode video data using MV-HEVC, 3D-HEVC, SHVC, or another multi-layer coding technique).

In some instances, multiple layers of video data may be coded in parallel using an offset delay. An offset delay may generally refer to a delay associated with processing (e.g., encoding or decoding) multiple layers in parallel. For example, a video decoder may decode more than one layer of a multi-layer bitstream in parallel. When using inter-layer prediction techniques to decode a current layer, however, the video decoder may access reference data of a reference layer that is different than the current layer. The reference data must be available (e.g., decoded) in order to be used as an inter-layer reference for decoding the current layer. Accordingly, in general, the video decoder finalizes decoding of all reference layers in a multi-layer decoding scheme prior to decoding a layer that refers to one or more of the reference layers.

Rather than waiting for an entire reference layer to be finalized (e.g., decoded), the video decoder may delay initiating decoding of a current layer until at least some of the reference layer has been decoded. The offset delay may generally indicate a minimum amount of a reference layer that is to be decoded before the video decoder begins decoding a current layer. Implementing an offset delay may help to ensure that inter-layer reference data is available to be used as a reference, while still allowing at least a portion of the reference layer and the current layer to be decoded in parallel. For example, a parallel decoder may start decoding an enhancement layer as soon as the specified reference layer offset delay is achieved. While the example above is described with respect to video decoding (as performed by a parallel decoder), it should be understood that similar techniques may be applied by a video encoder during parallel encoding.

The design of HEVC and HEVC extensions (e.g., such as MV-HEVC, 3D-HEVC, or SHVC) may exhibit certain drawbacks. For example, when used across layers certain configurations of tiles and WPP may affect the pipelining design (e.g., allocation of resources across layers) and implementation of a codec. In some instances, a pipeline design may need to change for different configurations of tiles and WPP. For example, when performing inter-layer prediction using tiles, tiles having the same relative spatial location in the layers should be processed by the same processing resources (e.g., the same processing core) so that the data for inter-layer prediction does not need to be accessed by different processing cores. In addition, in some instances, the memory, cycles and the delay requirements may be different for different layers.

The utilization of the above-described parallel coding tools (e.g., tiles and/or WPP) across layers may typically be derived by parsing the active picture parameter set (PPS) of each layer. However, parsing such information from a PPS may not be a straightforward process and may introduce delay, because the content of of an active PPS is known only after the activation process has commenced (e.g., while decoding pictures within a particular layer). Furthermore, finding all of the relevant PPSs for a coded video sequence and parsing the PPSs may require computationally burdensome parsing efforts.

Another potential issue with the HEVC design and the relevant extensions (e.g., such as MV-HEVC, 3D-HEVC, and/or SHVC) is that when tiles are used across layers (e.g., in more than one layer of multi-layer video data) for parallelism, loop filters may be applied across tile boundaries. A loop filter may include a deblocking filter or other filter that is used in the video coding process to improve video quality. Despite the potential for improving video quality, allowing a loop filter to be applied across a tile boundary may affect the parallelism and introduce a delay. For example, if loop filtering is applied across tiles, a block of a particular tile may be changed due to the loop filtering, which may cause issues for performing inter-layer prediction using that tile.

This disclosure describes techniques for signaling information related to parallel processing. The techniques of this disclosure may allow a video decoder to determine the configurations of tiles and/or the WPP configuration across layers of a coded video sequence at a relatively early point in the decoding process of the coded video sequence. In addition, the techniques of this disclosure may allow a video decoder to determine whether loop filters may be applied across tile boundaries at a relatively early point in the decoding process. Determining such information relatively early in the decoding process may, in some instances, allow the video decoder to more efficiently assign system resources and reduce delay (e.g., relative to providing such information in another location, such as a PPS, as described above). That is, the parallel processing information allows the video decoder to determine whether parallel coding tools are used, and if so, the manner in which the parallel coding tools are implemented.

In some examples, the parallel processing information may be provided in a video parameter set (VPS), as described in greater detail below. In other examples, the parallel processing information may be provided in VPS video usability information (VUI), as described in greater detail below. The VPS is decoded relatively early in the decoding process (e.g., relative to the PPS). Thus, according to aspects of this disclosure and as described in greater detail below, the parallel processing information of the VPS (or VPS VUI) may provide an early indication of parallel processing information that is used during coding. That is, the parallel processing information of the VPS may supplement other parallel processing information that may be provided in a PPS and used during coding. For example, the parallel processing information of the VPS (or VPS VUI) may provide an early indication of parallel processing information that is included in a PPS. In this manner, as described in greater detail below, a video decoder may decode the parallel processing information from the VPS (or VPS VUI), determine whether (and/or how) parallel processing coding tools are used in the multi-layer bitstream, and allocate decoding resources based on the information of the parallel processing information from the VPS. The video decoder may then commence decoding the multi-layer bitstream using the parallel processing information of a PPS that was indicated by the VPS.

According to aspects of this disclosure, a video decoder may be configured to parse one or more syntax elements corresponding to video data, wherein the one or more syntax elements indicate one or more of a tile configuration, a loop filter configuration, and a parallel processing configuration, and perform parallel decoding of the video data in accordance with the one or more syntax elements.

FIG. 1 is a block diagram illustrating an example video encoding and decoding system 10 that may utilize the techniques for parallel video processing described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback.

Destination device 14 includes an input interface 28, a video decoder 30, and a display device 33. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 33 may be integrated with, or external to, destination device 14. In some examples, destination device 14 may include an integrated display device and also be configured to interface with an external display device. In other examples, destination device 14 may be a display device. In general, display device 33 displays the decoded video data to a user, and may comprise any of a variety of display devices such as a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Video encoder 20 and video decoder 30 may operate according to a video compression standard, such as the HEVC standard developed by the Joint Collaboration Team on Video Coding (JCT-VC) of ITU-T Video Coding Experts Group (VCEG) and ISO/IEC Motion Picture Experts Group (MPEG). HEVC is described in ITU-T H.265, SERIES H: AUDIOVISUAL AND MULTIMEDIA SYSTEMS, Infrastructure of Audiovisual Services—Coding of Moving Video, "High Efficiency Video Coding," April 2013. One HEVC draft specification, and referred to as HEVC WD hereinafter, is available from http/phenix.int-evry.fr/jct/doc_end_userdocuments/14_Vienna/wg11/JCTVC-N1003-v1.zip.

Various extensions to HEVC have been proposed. For example, the multi-view extension to HEVC, namely MV-HEVC, and another HEVC extension for more advanced 3D video coding (3D-HEVC) are being developed by the JCT-3V. Meanwhile, the scalable video coding extension to HEVC, namely SHVC, is being developed by the JCT-VC. A recent Working Draft (WD) of MV-HEVC, referred to as MV-HEVC WD5 hereinafter, is available from http://phenix.it-sudparis.eu/jct2/doc_end_user/documents/5_Vienna/wg11/JCT3V-E1004-v6.zip. A recent WD of 3D-HEVC, referred to as 3D-HEVC WD1 hereinafter, is available from http://phenix.it-sudparis.eu/jct2/doc_end_user-documents/5_Vienna/wg11/JCT3V-E1001-v3.zip. A recent WD of SHVC and referred to as SHVC WD3 hereinafter, is available from http://phenix.it-sudparis.eu/jct/doc_end_user/documents/14_Vienna/wg11/JCTVC-N1008-v3.zip. Another extension to HEVC is the HEVC Range Extension, described in "High Efficiency Video Coding (HEVC) Range Extensions text specification: Draft 4," JCTVC-N1005_v1. April 2013 (hereinafter, "JCTVC-N1005").

The techniques of this disclosure, however, are not limited to any particular coding standard. Accordingly, the techniques of this disclosure may be applied to any of a variety of coding standards in which indication of parallel processing may be desirable.

With respect to HEVC, as an example, the standardization efforts were based on an evolving model of a video coding device referred to as the HEVC Test Model (HM).

The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HEVC HM describes that a video frame or picture may be divided into a sequence of coding tree blocks (CTBs) or largest coding units (LCUs) that include both luma and chroma samples. In many examples, a CTB is an N×N block of samples (e.g., luma or chroma samples). A CTB has a similar purpose as a macroblock of the H.264 standard. A slice includes a number of consecutive CTBs in coding order. A video frame or picture may be partitioned into one or more slices. Each CTB may be split into coding units (CUs) according to a quadtree. For example, a CTB, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a CTB may be split, and may also define a minimum size of the coding nodes.

A CU includes a coding node and prediction units (PUs) and transform units (TUs) associated with the coding node. A size of the CU generally corresponds to a size of the coding node and must typically be square in shape. The size of the CU may range from 8×8 pixels up to the size of the CTB with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values from the video block identified by the coding node in accordance with the PU. The coding node is then updated to reference the residual values rather than the original video block. The residual values comprise pixel difference values that may be transformed into transform coefficients, quantized, and scanned using the transforms and other transform information specified in the TUs to produce serialized transform coefficients for entropy coding. The coding node may once again be updated to refer to these serialized transform coefficients. This disclosure typically uses the term "video block" to refer to one or more of a CTB, LCU or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure. "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data to which the transforms specified by TUs of the CU are applied. The residual data may correspond to pixel differences between pixels of the unencoded picture and prediction values corresponding to the CUs. Video encoder 20 may form the residual data for the CU, and then transform the residual data to produce transform coefficients.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a pre-defined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

As noted above, the techniques of this disclosure may be used to provide early indication of parallel coding tools, such as coding video data using tiles and/or WPP. For example, a typical bitstream configuration may be as follows: Video Parameter Set (VPS), VPS extension, Sequence Parameter Set (SPS), SPS extension, Picture Parameter Set (PPS), PPS extension, slice header, video payload. In some instances, parallel coding tools may be indicated in the PPS and/or PPS extension.

The techniques of this disclosure may, in some instances, be used to provide an early indication to a video decoder of whether parallel coding tools are used within layers of a multi-layer bitstream, e.g., in the VPS, received by the video decoder. For example, the parallel processing information of the VPS may supplement other parallel processing information that may be provided in a PPS and used during coding, thereby providing an early indication of parallel processing information that is included in the PPS (e.g., because the information of the VPS is decoded prior to the PPS).

According to aspects of this disclosure, the techniques may allow a video decoder, such as video decoder 30, to efficiently assign decoding resources for decoding the multi-layer video data and reduce overall decoding delay. For example, video encoder 20 may encode (and video decoder 30 may decode) data of a VPS and/or VPS VUI that indicates a tile configuration for layers of a multi-layer bitstream and/or a parallel processing configuration for layers of the multi-layer bitstream. In particular, with respect to the parallel processing configuration, the data may indicate whether parallel processing synchronization is performed (e.g., entropy coding synchronization, as performed in WPP).

In general, a VPS may include data describing the overall characteristics of a coded video sequence, including dependencies between sub-layers. One purpose of the VPS may be to enable compatible extensibility of a particular standard in terms of signaling at the systems layer. A VPS must typically be included in a multi-layer bitstream for the bitstream to be decoded. A VPS may, additionally or alternatively, include data defining video usability information (VUI), such as video representation information, hypothetical reference decoder (HRD) parameters, and/or bitstream restriction information. Bitstream restriction information may include restrictions on motion vector range, decoded picture buffer (DPB) size (e.g., in terms of a number of pictures to be held by the DPB), number of reordering frames (that is, an indication of a number of frames to be reordered from decoding order to display order), coded sizes of blocks (e.g., macroblocks (MBs) or coding tree units), and coded sizes of pictures. A VPS may further provide data for one or more VPS extensions, such that the VPS can be extended by future standards or extensions to the upcoming HEVC standard. In this disclosure, the acronym VPS may jointly refer to both a VPS and VPS VUI, as applicable.

An example VPS VUI for indicating the configurations of tiles and WPP for each layer is illustrated in Table 1 below. WPP is described in greater detail, for example, with respect to FIGS. 4A-5 below. Tiles are described in greater detail, for example, with respect to FIG. 6 below. According to aspects of this disclosure, video encoder 20 may encode the syntax elements shown in Table 1 and include the encoded syntax elements in an encoded bitstream. Likewise, video decoder 30 may parse and decode the syntax elements from an encoded bitstream.

TABLE 1

VPS VUI Example #1

| | Descriptor |
|---|---|
| vps_vui( ){ | |
| ... | |
|   for( i = 0; 1 <= vps_max_layers_minus1; i++ ) { | u(1) |
|     tiles_enablet_vps_flag[ i ] | |
|     if( tiles_enabled_vps_flag[ i ] ) | |
|       loop_filter_across_tiles_disabled_vps_flag[ i ] | u(1) |
|     entropy_coding_sync_enabled_vps_flag[ i ] | u(1) |
|   } | |
|   for( i = 1; i <= vps_max_layers_minus1; i++ ) | |
|     for( j = 0; j < NumDirectRefLayers | |
|     [ layer_id_in_nuh[ i ] ]; j++) { | |
|       if( tiles_enabled_vps_flag[ i ] ) | |
|         tile_boundaries_aligned_flag[ i ][ j ] | u(1) |
| ... | |

The syntax element tiles_enabled_vps_flag[i] being equal to a value of indicates that the value of the tiles_enabled_flag is equal to 1 for each PPS that is referred to by (e.g., associated with) at least one picture of the i-th layer specified by the VPS. The syntax element tiles_enabled_vps_flag[i] being equal to a value 0 indicates that the value of the tiles_enabled_flag is equal to 0 for each PPS that is referred to by (e.g., associated with) at least one picture of the i-th layer specified by the VPS.

The syntax element tiles_enabled_flag equal to 1 specifies that there is more than one tile in each picture referring to the PPS. The syntax element tiles_enabled_flag being equal to a value of 0 specifies that there is only one tile in each picture referring to the PPS.

The syntax element loop_filter_across_tiles_disabled_vps_flag[i] equal to 1 indicates that the value of the loop_filter_across_tiles_enabled_flag is equal to 0 for each PPS that is referred to by (e.g., associated with) at least one picture of the i-th layer specified by the VPS. The syntax element loop_filter_across_tiles_enabled_vps_flag[i] being equal to a value of 0 indicates that the above constraint may or may not apply.

The syntax element loop_filter_across_tiles_enabled_flag equal to 1 specifies that in-loop filtering operations are performed across tile boundaries. The syntax element loop_filter_across_tiles_enabled_flag being equal to a value of 0 specifies that in-loop filtering operations are not performed across tile boundaries. The in-loop filtering operations may include the deblocking filter and sample adaptive offset filter operations. When not present (e.g., the syntax element loop_filter_across_tiles_enabled_flag is not included in the bitstream), the value of the syntax element loop_filter_across_tiles_enabled_flag is inferred to be equal to 1.

The syntax element entropy_codlng_sync_enabled_vps_flag[i] equal to 1 indicates that the value of the syntax element entropy_coding_sync_enabled_flag is equal to 1 for each PPS that is referred to by (e.g., associated with) at least one picture of the i-th layer specified by the VPS. The syntax element entropy_coding_sync_enabled_vps_flag[i] being equal to a value of 0 indicates that the value of the syntax element entropy_coding_sync_enabled_flag is equal to 0 for each PPS that is referred to by (e.g., associated with) at least one picture of the i-th layer specified by the VPS.

The syntax element entropy_coding_sync_enabled_flag equal to 1 specifies that a specific synchronization process for context variables is invoked before decoding the first coding tree block of a row of coding tree blocks in each tile in each picture referring to the PPS, and a specific memorization process for context variables is invoked after decoding two coding tree blocks of a row of coding tree blocks in each tile in each picture referring to the PPS. The syntax element entropy_coding_sync_enabled_flag being equal to a value of 0 specifies that no specific synchronization process for context variables is required to be invoked before decoding the first coding tree block of a row of coding tree blocks in each tile in each picture referring to the PPS, and no specific memorization process for context variables is required to be invoked after decoding two coding tree blocks of a row of coding tree blocks in each tile in each picture referring to the PPS.

Accordingly, upon receiving the syntax elements included in the example of Table 1 above, video decoder 30 may determine a tile configuration and/or parallel processing configuration for layers of a multi-layer bitstream. For example, for each layer from 0 to the maximum number of layers (e.g., for (i=0; i<=vps_max_layers_minus1; i++) video decoder 30 may obtain, from a VPS of an encoded bitstream, data that indicates whether tiles are enabled in at least one picture in the layer (e.g., the tiles_enabled_vps_flag[i] syntax element). In addition, for each layer for which tiles are enabled (e.g., if (tiles_enabled_vps_flag[i])) video decoder 30 may also obtain data that indicates whether loop filtering is applied across tile boundaries, or whether loop filtering across tile boundaries is disabled (e.g., the loop_filter_across_tiles_disabled_vps_flag[i] syntax element).

In addition, video decoder 30 may also obtain data that indicates a parallel processing configuration. For example, video decoder 30 may obtain data that indicates whether entropy coding synchronization is performed, e.g., via WPP (e.g., the entropy_coding_sync_enabled_vps_flag[i]). In other examples, syntax elements having a different naming convention may be used to convey the tile configuration and/or parallel processing configuration.

In another example, the techniques of this disclosure include signaling/reading an indication of cross-layer alignment of tiles, and WPP and loop filter configurations (e.g., the use of loop filter across tile boundaries, loopfilter_across_tile_boundary) in a VPS. In a first example, the indication of the configurations of tiles and WPP for each layer may be made in the modified VPS VUI as shown below in Table 2. Video encoder 20 may encode the syntax elements shown in Table 2 and include the encoded syntax elements in an encoded bitstream. Likewise, video decoder 30 may parse and decode the syntax elements from an encoded bitstream.

TABLE 2

| VPS VUI Example #2 | |
|---|---|
| | Descriptor |
| vps_vui( ){ | |
| ... | |
| parallel_tools_vps_idc | u(2) |
| ... | |

The syntax element parallel_tools_vps_idc equals to 0 indicates that both the syntax element tiles_enabled_flag and the syntax element entropy_coding_sync_enabled_flag are equal to 0 for the pictures. The syntax element parallel_tools_vps_idc equals to 1 indicates that the syntax element entropy_coding_sync_enabled_flag is equal to 1 and the syntax element tiles_enabled_flag is equal to 0 for the pictures in all layers. The syntax element parallel_tools_vps_idc equals to 2 indicates that the syntax element tiles_enabled_flag is equal to 1 and the syntax element entropy_coding_sync_enabled_flag is equal to 0 for the pictures in all layers. The syntax element parallel_tools_vps_idc equals to 3 indicates that the syntax element tiles_enabled_flag may be equal to 1 for pictures in zero or more layers and the syntax element entropy_coding_sync_enabled_flag may be equal to 1 for the pictures in zero or more layers.

Tables 3 and 4 below show additional examples of how the VPS VUI may be modified to indicate the configuration of tiles and WPP. According to aspects of this disclosure, video encoder 20 may encode the syntax elements shown in Tables 3 and 4 and include the encoded syntax elements in an encoded bitstream. Likewise, video decoder 30 may parse and decode the syntax elements from an encoded bitstream.

TABLE 3

VPS VUI Example #3

| | Descriptor |
|---|---|
| vps_vui( ){ | |
| ... | |
|   for( i = 0; i <= vps_max_layers_minus1; i++ ) { | |
|     parallel_tools_vps_idc[ i ] | u(2) |
|   } | |
| ... | |

The syntax element parallel_tools_vps_idc[i]: being equal to a value of 0 indicates that both the syntax element tiles_enabled_flag and the syntax element entropy_coding_sync_enabled_flag are equal to 0 for the picture of the i-th layer referring to an active PPS. The syntax element parallel_tools_vps_idc[i] equal to 1 indicates that the syntax element entropy_coding_sync_enabled_flag is equal to 1 for the picture of the i-th layer and all of its direct reference layer pictures referring to an active PPS. The syntax element parallel_tools_vps_idc[i] equal to 2 indicates that the syntax element tiles_enabled_flag is equal to 1 for the picture of the i-th layer and all of its direct reference layer pictures referring to an active PPS. The syntax element parallel_tools_vps_idc[i] equal to 3 indicates that, when the syntax element tiles_enabled_flag is equal to 1 for the picture of the i-th layer, then at least one of its direct reference layers have the syntax element entropy_coding_sync_enabled_flag=1 and, when the syntax element entropy_coding_sync_enabled_flag=1 for the picture of the i-th layer, then at least one of its direct reference layers have the syntax element tiles_enabled_flag equal to 1.

TABLE 4

VPS VUI Example #4

| | Descriptor |
|---|---|
| vps_vui( ){ | |
| ... | |
|   for( i = 0; i <= vps_max_layers_minus1; i++ ) | |
|     for( j = 0; j < NumDirectRefLayers | u(1) |
|     [ layer_id_in_nuh[ i ] ]; j++ ) { | |
|       tile_boundaries_aligned_flag[ i ][ j ] | u(1) |
|       if(tile_boundaries_aligned_flag[ i ][ j ] == 0) | |
|         tile_entropy_sync_coding_not_mixed_flag[ i ][ j ] | u(1) |
|         loopfilter_across_tile_boundary_not_mixed_flag[ i ][ j ] | u(1) |
|   } | |
| ... | |

The syntax element tile_entropy_sync_coding_not_mixed_flag[i][j]: equal to 1 indicates that, within a CVS, when the syntax element tiles_enabled_flag is equal to 1 for an active PPS of i-th layer, the syntax element entropy_coding_sync_enabled_flag is equal to 0 for an active PPS of the j-th direct reference layer of the i-th layer or when the syntax element entropy_coding_sync_enabled_flag is equal to 1 for an active PPS of i-th layer, the syntax element tiles_enabled_flag is equal to 0 for an active PPS of the j-th direct reference layer of the i-th layer. The syntax element tile_entropy_sync_coding_not_mixed_flag[i][j] being equal to a value of 0 indicates that such a restriction may or may not apply. In such examples, one or more additional syntax elements may be used to indicate whether to apply the restriction.

The syntax element loopfilter_across_tile_boundary_not_mixed_flag[i][j]: equal to 1 indicates that, within a CVS, when the syntax element loop_filter_across_tiles_enabled_flag is equal to 1 for an active PPS of i-th layer, the syntax element loop_filter_across_tiles_enabled_flag is also equal to 1 for an active PPS of the j-th direct reference layer of the i-th layer. The syntax element loopfilter_across_tile_boundary_not_mixed_flag[i][j] being equal to a value of 0 indicates that such a restriction may or may not apply. In such examples, one or more additional syntax elements may be used to indicate whether to apply the restriction.

In this manner, video encoder 20 may encode, in a video parameter set (VPS) of a multi-layer bitstream, at least one of data that indicates a tile configuration for layers of the multi-layer bitstream or data that indicates a parallel processing configuration for layers of the multi-layer bitstream. Likewise, video decoder 30 may decode, from a video parameter set (VPS) of a multi-layer bitstream, at least one of data that indicates a tile configuration for layers of the multi-layer bitstream or data that indicates a parallel processing configuration for layers of the multi-layer bitstream.

Figure 2:
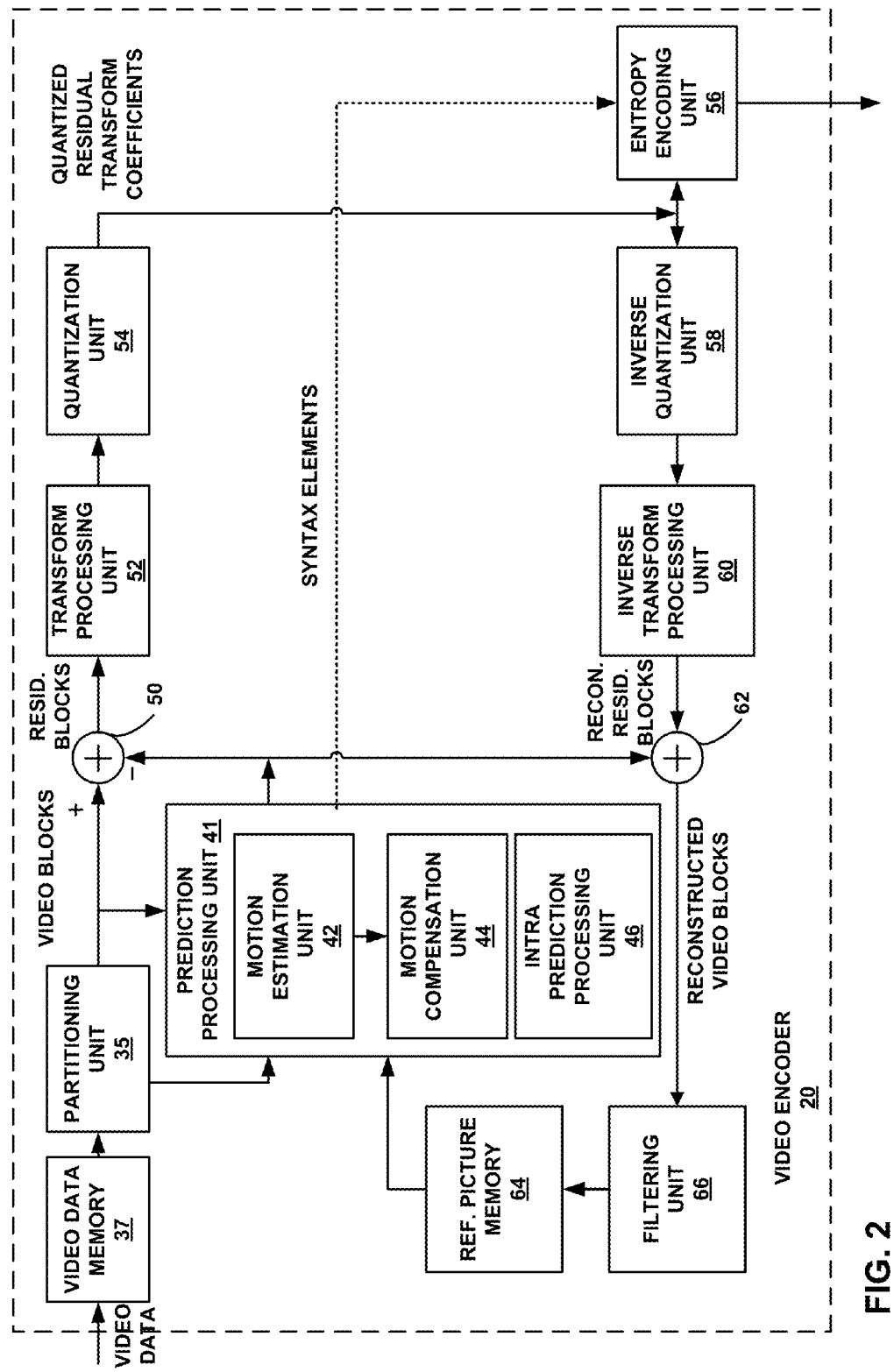
FIG. 2 is a block diagram illustrating an example video encoder that may implement the techniques described in this disclosure.

FIG. 2 is a block diagram illustrating an example video encoder 20 that may implement the techniques described in this disclosure. In particular, video encoder 20 may be configured to encode data of a multi-layer bitstream according to techniques of this disclosure. As noted above, video encoder 20 may be adapted to perform multiview and/or scalable video coding. For example, video encoder 20 may be configured to encode a bitstream that conforms to one or more video coding standard extensions, such as SHVC, MV-HEVC, or 3D-HEVC. However, while reference is made to specific coding standards, it should be understood that the techniques are not specific to any one coding standard, and may be implemented with future and/or not yet developed standards.

In the example of FIG. 2, video encoder 20 includes a partitioning unit 35, video data memory 37, prediction processing unit 41, reference picture memory 64, summer 50, transform processing unit 52, quantization unit 54, and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, a summer 62, and a reference picture memory 64 (which may also be referred to as a decoded picture buffer (DPB)), and a filtering unit 66.

Video data memory 37 may store video data to be encoded by the components of video encoder 20. The video data stored in video data memory 37 may be obtained, for example, from video source 18. Reference picture memory 64 may be referred to as a decoded picture buffer that stores reference video data for use in encoding video data by video encoder 20, e.g., in intra- or inter-coding modes. Video data memory 37 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 37 and reference picture memory 64 may be provided by the same memory device or separate memory devices. In various examples, video data memory 37 may be on-chip with other components of video encoder 20, or off-chip relative to those components.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

For example, as shown in FIG. 2, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra prediction processing unit 46 may intra-predict a current block, as an alternative to the inter-prediction performed by motion estimation unit 42 and motion compensation unit 44, as described above. In particular, intra prediction processing unit 46 may determine an intra-prediction mode to use to encode a current block. In some examples, intra prediction processing unit 46 may encode a current block using various intra-prediction modes, e.g., during separate encoding passes, and intra prediction processing unit 46 (or mode select unit 40, in some examples) may select an appropriate intra-prediction mode to use from the tested modes. For example, intra prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra-prediction mode exhibits the best rate-distortion value for the block.

In any case, after selecting an intra-prediction mode for a block, intra prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include, in the transmitted bitstream, configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

Filtering unit 66 may perform a variety of filtering processes. For example, filtering unit 66 may perform deblocking filtering. That is, filtering unit 66 may receive a plurality of reconstructed video blocks forming a slice or a frame of reconstructed video and filter block boundaries to remove blockiness artifacts from a slice or frame. In one example, filtering unit 66 evaluates the so-called "boundary strength" of a video block. Based on the boundary strength of a video block, edge pixels of a video block may be filtered with respect to edge pixels of an adjacent video block such that the transitions from one video block to another are more difficult for a viewer to perceive.

In some instances, the variables used by a deblocking filter may be derived from reconstructed video blocks without a comparison of reconstructed video blocks to the original source video blocks. Thus, video encoder 20 and video decoder 30 (FIG. 3) may each be programmed to perform the same deblocking process on reconstructed video blocks with minimal additional information regarding the original video frame coded into the bitstream. However, in some cases, filtering unit 66 may include syntax elements in the bitstream to indicate whether deblocking should be performed and/or whether one of a particular type of deblocking modes should be performed. In other examples, filtering unit 66 may apply a number of additional and/or alternative filters, such as sample adaptive offset (SAO) filters or other filters.

According to aspects of this disclosure, video encoder 20 may be configured to encode data that indicates a tile configuration and/or a parallel processing configuration for layers of a multi-layer bitstream. For example, video encoder 20 may be configured to encode data of a VPS and/or VPS VUI that indicates a tile configuration for layers of a multi-layer bitstream and/or a parallel processing configuration for layers of the multi-layer bitstream. In particular, with respect to the parallel processing configuration, the data may indicate whether parallel processing synchronization is performed (e.g., entropy coding synchronization, as performed in WPP).

In some examples, the data indicating the tile configuration and/or parallel processing configuration may include a number of syntax elements. For example, for each layer of video data in the multi-layer bitstream, video encoder 20 may encode one or more syntax elements that indicate whether tiles are enabled in at least one picture in the layer (e.g., such as tiles_enabled_vps_flag[i] syntax element shown in the example of Table 1 above). In addition, for each layer for which tiles are enabled, video encoder 20 may also encode one or more syntax elements that indicate whether loop filtering is applied across tile boundaries, or whether loop filtering across tile boundaries is disabled (e.g., such as the loop_filter_across_tiles_disabled_vps_flag[i] syntax element shown in the example of Table 1 above). In some instances, video encoder 20 may also encode one or more syntax elements that indicate a parallel processing configuration. For example, video encoder 20 may encode one or more syntax elements that indicate whether entropy coding synchronization is performed, e.g., via WPP (e.g., such as the entropy_coding_sync_enabled_vps_flag[i] syntax element shown in the example of Table 1 above).

Figure 3:
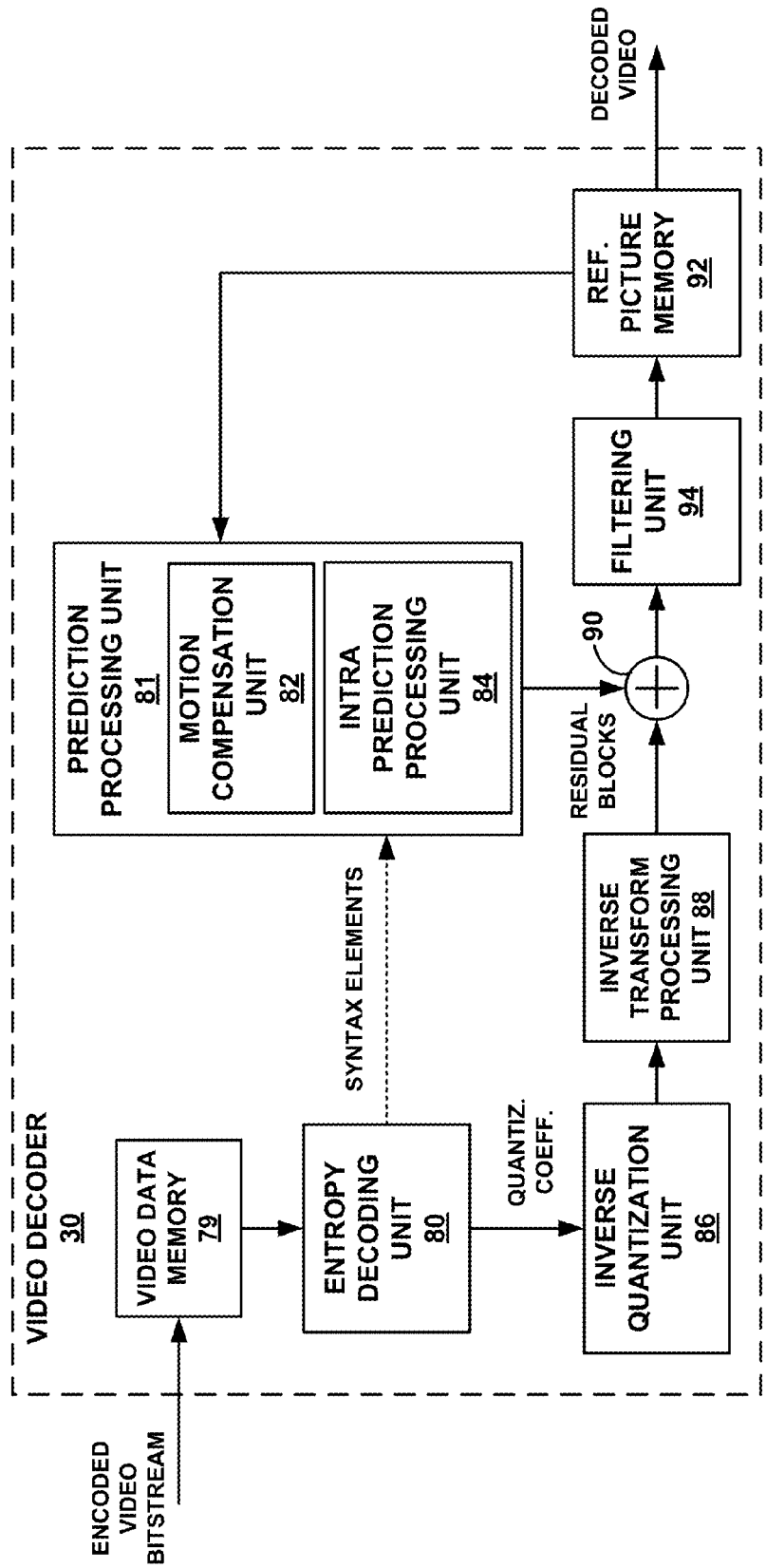
FIG. 3 is a block diagram illustrating an example video decoder that may implement the techniques described in this disclosure.

FIG. 3 is a block diagram illustrating an example video decoder 30 that may implement the techniques described in this disclosure. In particular, video decoder 30 may be configured to perform wavefront parallel processing of video data according to techniques of this disclosure. As noted above, video decoder 30 may be adapted to perform multiview and/or scalable video coding. For example, video decoder 30 may be configured to decode a bitstream that conforms to one or more video coding standard extensions, such as SHVC, MV-HEVC, or 3D-HEVC. However, while reference is made to specific coding standards, it should be understood that the techniques are not specific to any one coding standard, and may be implemented with future and/or not yet developed standards.

In the example of FIG. 3, video decoder 30 includes video data memory 79, an entropy decoding unit 80, prediction processing unit 81, inverse quantization unit 86, inverse transformation processing unit 88, summer 90, reference picture memory 92, and filtering unit 94. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 2.

Video data memory 79 may store video data, such as an encoded video bitstream, to be decoded by the components of video decoder 30. The video data stored in video data memory 79 may be obtained, for example, from computer-readable medium, e.g., from a local video source, such as a camera, via wired or wireless network communication of video data, or by accessing physical data storage media. Video data memory 79 may form a coded picture buffer (CPB) that stores encoded video data from an encoded video bitstream. Reference picture memory 92 may be referred to as a decoded picture buffer that stores reference video data for use in decoding video data by video decoder 30, e.g., in intra- or inter-coding modes. Video data memory 79 and reference picture memory 92 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 79 and reference picture memory 92 may be provided by the same memory device or separate memory devices. In various examples, video data memory 79 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation.

Filtering unit 94 may, in some examples, be configured similarly to filtering unit 66 of video encoder 20 (FIG. 2). For example, filtering unit 94 may be configured to perform deblocking, SAO, or other filtering operations when decoding and reconstructing video data from an encoded bitstream. The decoded video blocks in a given frame or picture are then stored in reference picture memory 92, which stores reference pictures used for subsequent motion compensation. Reference picture memory 92 also stores decoded video for later presentation on a display device, such as display device 33 of FIG. 1.

According to aspects of this disclosure, video decoder 30 may be configured to decode data that indicates a tile configuration and/or a parallel processing configuration for layers of a multi-layer bitstream. For example, video decoder 30 may be configured to decode data of a VPS and/or VPS VUI that indicates a tile configuration for layers of a multi-layer bitstream and/or a parallel processing configuration for layers of the multi-layer bitstream. In particular, with respect to the parallel processing configuration, the data may indicate whether parallel processing synchronization is performed (e.g., entropy coding synchronization, as performed in WPP).

In some examples, the data indicating the tile configuration and/or parallel processing configuration may include a number of syntax elements. For example, for each layer of video data in the multi-layer bitstream, video decoder 30 may decode one or more syntax elements that indicate whether tiles are enabled in at least one picture in the layer (e.g., such as tiles_enabled_vps_flag[i] syntax element shown in the example of Table 1 above). In addition, for each layer for which tiles are enabled, video decoder 30 may also decode one or more syntax elements that indicate whether loop filtering is applied across tile boundaries, or whether loop filtering across tile boundaries is disabled (e.g., such as the loop_filter_across_tiles_disabled_vps_flag[i] syntax element shown in the example of Table 1 above). In some instances, video decoder 30 may also decode one or more syntax elements that indicate a parallel processing configuration. For example, video decoder 30 may decode one or more syntax elements that indicate whether entropy coding synchronization is performed, e.g., via WPP (e.g., such as the entropy_coding_sync_enabled_vps_flag[i] syntax element shown in the example of Table 1 above).

According to aspects of this disclosure, video decoder 30 may perform video decoding of the video data in accordance with the syntax elements. For example, video decoder 30 may assign decoding resources based on the decoded syntax elements and proceed with decoding the video data.

FIGS. 4A and 4B depict conceptual diagrams showing examples of CTB synchronization in wavefront parallel processing. It should be noted that the examples of FIG. 4A and FIG. 4B are presented for illustrative purposes. In other examples, more than two CTB row may be processed in parallel. In addition, a video frame may comprise more or fewer CTBs in a CTB row than the 7 CTBs that are depicted in FIG. 4A and FIG. 4B.

FIG. 4A shows an example of wavefront parallel processing with synchronization points delayed by one CTB. In the example of FIG. 4A, two CTB rows are processed (e.g., decoded) in parallel. Decoding of CTB 0 in CTB row 1, at synchronization point A, does not begin until decoding of CTB row 0 also reaches synchronization point A.

In the example of FIG. 4A, synchronization point A occurs after decoding of CTB 0 in CTB row 0 has been completed. This delay allows for the decoding of syntax elements and/or pixel information in CTB 0 in row 1 that rely on decoded syntax elements and/or pixel information in a CTB directly above, or above and to the left of the CTB. That is, video decoder 30 may require certain syntax elements in CTB 0 row 0 to have already been decoded, in order to properly decode syntax elements in CTB 0 row 1. Synchronization points B-G show other points at which coding of row 0 may be finished, before coding of row 1 may begin at the corresponding point. As can be seen, synchronization is required at each CTB. In this context, synchronization does not necessarily require the decoding at, e.g., point A, in both rows to occur simultaneously. Rather, synchronization merely requires that the decoding of the upper row reaches the synchronization point before decoding in the lower row may begin at the corresponding synchronization point.

FIG. 4B is conceptual diagram illustrating another example of synchronization points for wavefront parallel processing. In this example, decoding of pixel information and/or syntax elements in a lower CTB row (e.g., CTB row 1) may also depend on decoded pixel information and/or syntax elements in a CU located to the above and right of the currently decoded CU. As such, two CTBs in row 0 (i.e., CTB 0 and CTB 1) must be decoded before decoding can begin in CTB row 1. As shown in FIG. 4B, video decoder 30 may begin decoding CTB 0 in CTB row 1 when the decoding of CTB 1 in CTB row 0 has been completed.

As discussed above, syntax elements are typically encoded by entropy encoder in video encoder 20. For example, video encoder 20 may encode syntax elements using CABAC. Each syntax element may be binarized into one or more bins for application of CABAC. As such, syntax elements for entire CTBs may be signaled by a single bin or by many bins. It is desirable to have load balancing for the parsing operation between the CTBs. If the synchronization of the parsing module is relaxed to be performed at the beginning of every CTB row, instead of at every CTB, load balancing for parsing of the wavefront substreams (i.e., parsing of each CTB row) may be achieved. Therefore, in order to eliminate the need for per-CTB synchronization, video encoder 20 may be configured such that all syntax elements are decodable without the use of any syntax element information from a CTB row above the currently coded CTB.

WPP, as shown in the examples of FIGS. 4A and 4B, may be enabled using one or more syntax elements. For example, as set forth in the HEVC specification, the syntax element entropy_coding_sync_enabled_flag equal to 1 specifies that a specific synchronization process for context variables is invoked before decoding the coding tree unit which includes the first coding tree block of a row of coding tree blocks in each tile in each picture referring to the PPS, and a specific storage process for context variables is invoked after decoding the coding tree unit which includes the second coding tree block of a row of coding tree blocks in each tile in each picture referring to the PPS. In addition, the syntax element entropy_coding_sync_enabled_flag being equal to a value of 0 specifies that no specific synchronization process for context variables is required to be invoked before decoding the coding tree unit which includes the first coding tree block of a row of coding tree blocks in each tile in each picture referring to the PPS, and no specific storage process for context variables is required to be invoked after decoding the coding tree unit which includes the second coding tree block of a row of coding tree blocks in each tile in each picture referring to the PPS. In some instances, the entropy_coding_sync_enabled_flag syntax element may be used to control the synchronization described above with respect to FIGS. 4A and 4B.

FIG. 5 is a conceptual diagram illustrating another example of synchronization points for parallel processing of video block rows. In the example of FIG. 5, video encoder 20 and video decoder 30 are configured to parse all syntax elements without using any information from a CTB row above the currently coded CTB row. As such, the parsing part of wavefront parallel processing may proceed from a single synchronization point at the beginning of the CTB row, as any differences in parsing complexity and parsing time between the rows have no bearing on another row.

As shown in FIG. 5, coding of CTB row 0 may begin before the coding of CTB row 1, as predictive coding techniques (e.g., inter-prediction or intra-prediction) used during the reconstruction process may still rely on pixel information in the row above. As shown in FIG. 5, processing of CTB row 1 may begin as soon as reconstruction of CTB 1 in CTB row 0 is complete. However, unlike the example of FIG. 4A and FIG. 4B, no further synchronization points are used for processing CTB rows 0 and 1. As such, a first plurality of CTB rows may be processed in parallel, using the two CTB delay, with only one synchronization point, i.e., synchronization point A'. A second plurality of CTB rows (i.e., CTB rows 2 and 3) may be coded in parallel by video encoder 20 or video decoder 30 using a single synchronization point B' after the first plurality of CTB rows are processed. In the example of FIG. 5, the first and second groups of CTB rows include two CTB rows. However, more than two CTB rows may be processed in parallel using the techniques of this disclosure.

According to aspects of this disclosure, video encoder 20 may be configured to encode data that indicates a parallel processing configuration for layers of a multi-layer bitstream. For example, video encoder 20 may be configured to encode data of a VPS and/or VPS VUI that indicates a parallel processing configuration for layers of the multi-layer bitstream. In particular, with respect to the parallel processing configuration, the data may indicate whether parallel processing synchronization, such as that described above with respect to FIGS. 4A-5 is performed. Likewise, video decoder 30 may be configured to decode such data, e.g., from a VPS and/or VPS VUI.

In some examples, the data indicating the parallel processing configuration may include a number of syntax elements. For example, video encoder 20 may encode one or more syntax elements that indicate whether entropy coding synchronization is performed in any pictures of a layer in a multi-layer bitstream. That is, video encoder 20 may provide an early indication, using the VPS, of whether entropy coding synchronization enabled performed in layers of the multi-layer bitstream (e.g., due to the VPS occurring relatively earlier in the bitstream than the parameter sets actually enabling the entropy coding synchronization, such as a PPS). In an example for purposes of illustration, video encoder 20 may encode a entropy_coding_sync_enabled_vps_flag[i] syntax element that indicates whether the value of the syntax element entropy_coding_sync_enabled_flag is equal to 1 for each PPS that is referred to by at least one picture of a particular layer. Video decoder 30 may also be configured to decode such information from the VPS. Video decoder 30 may, in some instances, use such information to assign system resources for decoding the multi-layer video data.

Figure 6:
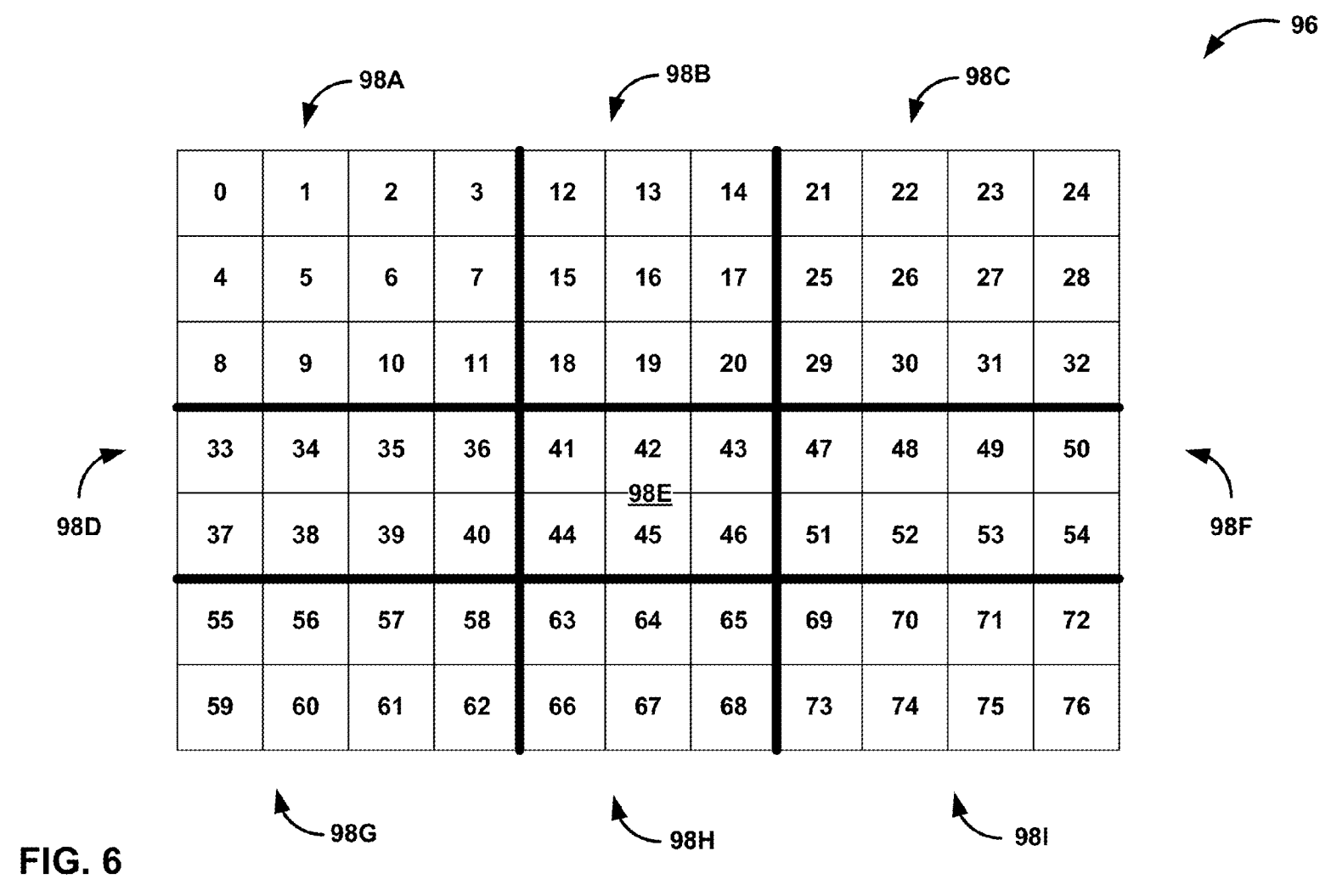

FIG. 6 is a conceptual diagram illustrating example tiles in accordance with the HEVC standard. Using the tile structure shown in FIG. 6 may, in some instances, make a codec more parallel-friendly. HEVC defines tiles as an integer number of CTBs co-occurring in one column and one row, ordered consecutively in a CTB raster scan of the tile. The division of each picture into tiles may be referred to as a partitioning. Tiles in a picture are ordered consecutively in the tile raster scan of the picture as shown in FIG. 6.

For example, FIG. 6 illustrates an example CTB coding order for a picture 96 that is partitioned into multiple tiles 98A, 98B, 98C, 98D, 98E, 98F, 98G, 98H, and 98I (collectively, "tiles 98"), with tile boundaries indicated by the thick lines. Each square block in picture 96 represents a pixel block associated with a CTB. The numbers in the pixel blocks indicate positions of the corresponding CTBs (e.g., LCUs) in a tile coding order for picture 96. As illustrated in the example of FIG. 6, CTBs in tile 98A are coded first, followed by CTBs in tile 98B, followed by CTBs in tile 98C, followed by CTBs in tile 98D, followed by CTBs in tile 98E, followed by CTBs in tile 98F, followed by CTBs in tile 98G, followed by CTBs in tile 98H, and followed by CTBs in tile 98I. Within each of tiles 98, the CTBs are coded according to a raster scan order.

The number of tiles and the locations of their boundaries may be defined for the entire sequence or changed from picture to picture. Tile boundaries, similarly to slice boundaries, break parse and prediction dependences so that a tile can be processed independently. However, in some instances, in-loop filters (e.g., de-blocking and sample adaptive offset (SAO) filters) may still cross tile boundaries. For example, HEVC provides for a loop_filter_across_tiles_enabled_flag syntax element specified in a PPS. When the value of the loop_filter_across_tiles_enabled_flag syntax element is equal to 1, in-loop filtering operations may be performed across tile boundaries in pictures referring to the PPS. A loop_filter_across_tiles_enabled_flag syntax element being equal to a value of 0 specifies that in-loop filtering operations are not performed across tile boundaries in pictures referring to the PPS.

Using tiles may enhance parallelism, because no (or relatively little) communication is needed between processors or processor cores for entropy decoding and motion compensation reconstruction. In addition, tiles may exhibit a relatively better coding efficiency when compared to slices, because tiles allow picture partition shapes that contain samples with potentially higher correlation than slices. Tiles may also reduce slice header overhead.

When a tile is used in single-layer coding, the syntax element min_spatial_segmentation_idc may be used by a video decoder (such as video decoder 30) to calculate the maximum number of luma samples to be processed by one processing thread, making the assumption that video decoder 30 maximally utilizes the parallel decoding information. When not equal to 0, a min_spatial_segmentation_idc syntax element may help to establish a bound on the maximum possible size of distinct coded spatial segmentation regions in the pictures of the coded video sequence. In HEVC there may be some picture inter-dependencies between the different threads, e.g., due to entropy coding synchronization or de-blocking filtering across tile or slice boundaries. Such inter-dependencies may affect the manner in which video decoder 30 assigns resources for decoding video data, as described herein.

According to aspects of this disclosure, video encoder 20 may encode data that indicates a tile configuration for layers of a multi-layer bitstream. For example, video encoder 20 may encode data of a VPS and/or VPS VUI that indicates whether tiles, such as the tiles shown and described above with respect to FIG. 6, are enabled for a particular layer of a multi-layer bitstream. Additionally or alternatively, video encoder 20 may encode data that indicates whether loop filtering across tiles is enabled or disabled. Video decoder 30 may be configured to decode such data, e.g., from a VPS and/or VPS VUI.

In some examples, the data indicating the tile configuration may include a number of syntax elements. For example, for each layer of video data in the multi-layer bitstream, video encoder 20 may encode one or more syntax elements that indicate whether tiles are enabled in at least one picture in the layer. In addition, for each layer for which tiles are enabled, video encoder 20 may also encode one or more syntax elements that indicate whether loop filtering is applied across tile boundaries, or whether loop filtering across tile boundaries is disabled. In this manner, video encoder 20 may provide an early indication, using the VPS, of a tile configuration (e.g., whether tiles are enabled and/or whether filtering may be applied across tiles) for layers of the multi-layer bitstream (e.g., due to the VPS occurring relatively earlier in the bitstream than the parameter sets actually enabling the entropy coding synchronization, such as a PPS).

In an example for purposes of illustration, video encoder 20 may encode a tiles_enabled_vps_flag[i] syntax element that indicates whether the value of the tiles_enabled_flag is equal to 1 for each PPS that is referred to by at least one picture of a particular layer. Additionally or alternatively, video encoder 20 may encode a loop_filter_across_tiles_disabled_vps_flag[i] syntax element that indicates whether the value of the loop_filter_across_tiles_enabled_flag is equal to 0 for each PPS that is referred to by at least one picture of a particular layer. Video decoder 30 may also be configured to decode such information from the VPS. Video decoder 30 may, in some instances, use such information to assign system resources for decoding the multi-layer video data.

FIGS. 7-10 illustrate a variety of multi-layer coding techniques that may be used in conjunction with the techniques of this disclosure. For example, the techniques may be applied to texture view components, depth view components, and the various temporal, spatial, and quality layers, as described herein.

Figure 7:
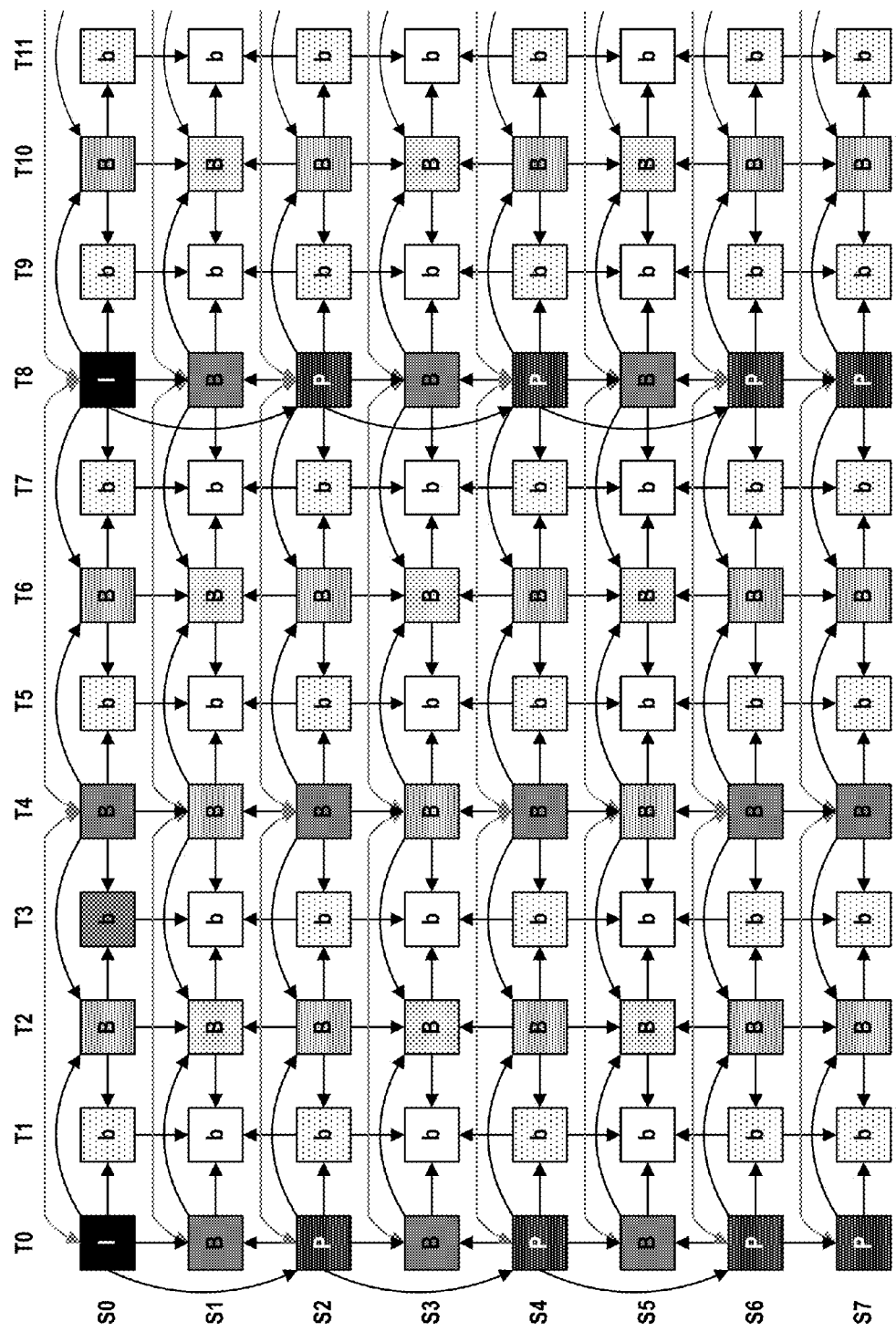
FIG. 7 is a conceptual diagram illustrating an example Multi-view Video Coding (MVC) prediction pattern.

FIG. 7 is a conceptual diagram illustrating an example MVC prediction pattern. While FIG. 7 is described with respect to H.264/AVC and MVC, it should be understood that a similar prediction pattern may be used with other multiview video coding schemes, including MV-HEVC, 3D-HEVC (a multiview plus depth extension to HEVC), and multiview using scalable video coding (see, for example, the scalable video coding example described with respect to FIGS. 8-10). Thus, references to multiview coding and/or MVC below apply to multiview video coding in general, and are not restricted to H.264/MVC.

In the example of FIG. 7, eight views (having view IDs "S0" through "S7") are illustrated, and twelve temporal locations ("T0" through "T1") are illustrated for each view. That is, each row in FIG. 7 corresponds to a view, while each column indicates a temporal location.

Although MVC has a so-called base view which is decodable by H.264/AVC decoders and stereo view pair could be supported also by MVC, the advantage of MVC is that it could support an example that uses more than two views as a 3D video input and decodes this 3D video represented by the multiple views. A renderer of a client having an MVC decoder may expect 3D video content with multiple views.

Pictures in FIG. 7 are indicated at the intersection of each row and each column in FIG. 7 using a shaded block including a letter, designating whether the corresponding picture is intra-coded (that is, an I-frame), or inter-coded in one direction (that is, as a P-frame) or in multiple directions (that is, as a B-frame). In general, predictions are indicated by arrows, where the pointed-to picture uses the point-from object for prediction reference. For example, the P-frame of view S2 at temporal location T0 is predicted from the I-frame of view S0 at temporal location T0.

As with single view video encoding, pictures of a multi-view video coding video sequence may be predicatively encoded with respect to pictures at different temporal locations. For example, the b-frame of view S0 at temporal location T1 has an arrow pointed to it from the I-frame of view S0 at temporal location T0, indicating that the b-frame is predicted from the I-frame. Additionally, however, in the context of multiview video encoding, pictures may be inter-view predicted. That is, a view component can use the view components in other views for reference. In MVC, as an example of multiview video coding, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references.

In MVC, inter-view prediction is allowed among pictures in the same access unit (that is, with the same time instance). An access unit is, generally, a unit of data including all view components (e.g., all network abstraction layer (NAL) units) for a common temporal instance. Thus, in MVC, inter-view prediction is permitted among pictures in the same access unit. When coding a picture in one of the non-base views, the picture may be added into a reference picture list, if it is in a different view but with the same time instance (e.g., the same POC value, and thus, in the same access unit). An inter-view prediction reference picture may be put in any position of a reference picture list, just like any inter prediction reference picture.

FIG. 7 provides various examples of inter-view prediction. Pictures of view S1, in the example of FIG. 7, are illustrated as being predicted from pictures at different temporal locations of view S1, as well as inter-view predicted from pictures of views S0 and S2 at the same temporal locations. For example, the b-frame of view S1 at temporal location T1 is predicted from each of the B-frames of view S1 at temporal locations T0 and T2, as well as the b-frames of views S0 and S2 at temporal location T1.

In the example of FIG. 7, capital "B" and lowercase "b" are intended to indicate different hierarchical relationships between pictures, rather than different encoding methodologies. In general, capital "B" pictures are relatively higher in the prediction hierarchy than lowercase "b" pictures. FIG. 7 also illustrates variations in the prediction hierarchy using different levels of shading, where a greater amount of shading (that is, relatively darker) pictures are higher in the prediction hierarchy than those pictures having less shading (that is, relatively lighter). For example, all I-frames in FIG. 7 are illustrated with full shading, while P-frames have a somewhat lighter shading, and B-frames (and lowercase b-frames) have various levels of shading relative to each other, but always lighter than the shading of the P-frames and the I-frames.

In general, the prediction hierarchy is related to view order indexes, in that pictures relatively higher in the prediction hierarchy should be decoded before decoding pictures that are relatively lower in the hierarchy, such that those pictures relatively higher in the hierarchy can be used as reference pictures during decoding of the pictures relatively lower in the hierarchy. A view order index is an index that indicates the decoding order of view components in an access unit. In this manner, pictures used as reference pictures may be decoded before decoding the pictures that are encoded with reference to the reference pictures.

According to aspects of this disclosure, video encoder 20 may encode data that indicates a tile configuration and/or a parallel processing configuration for layers of a multi-layer bitstream, such as the views S0-S7 shown in the example of FIG. 7. For example, video encoder 20 may encode data of a VPS and/or VPS VUI that indicates a tile configuration for views of the multi-view video data shown in the example of FIG. 7. For example, video encoder 20 may encode data of a VPS and/or VPS VUI that indicates whether tiles, such as the tiles shown and described above with respect to FIG. 6, are enabled for a particular view of the multi-view video data. Additionally or alternatively, video encoder 20 may encode data that indicates whether loop filtering across tiles is enabled or disabled. Video decoder 30 may be configured to decode such data, e.g., from a VPS and/or VPS VUI.

Additionally or alternatively, video encoder 20 may encode data of a VPS and/or VPS VUI that indicates a parallel processing configuration for views of the multi-view video data shown in the example of FIG. 7. For example, video encoder 20 may encode data of a VPS and/or VPS VUI that indicates whether the synchronization described above with respect to FIGS. 4A-5, is enabled for pictures of a particular view of the multi-view video data. Video decoder 30 may be configured to decode such data, e.g., from a VPS and/or VPS VUI.

Figure 8:
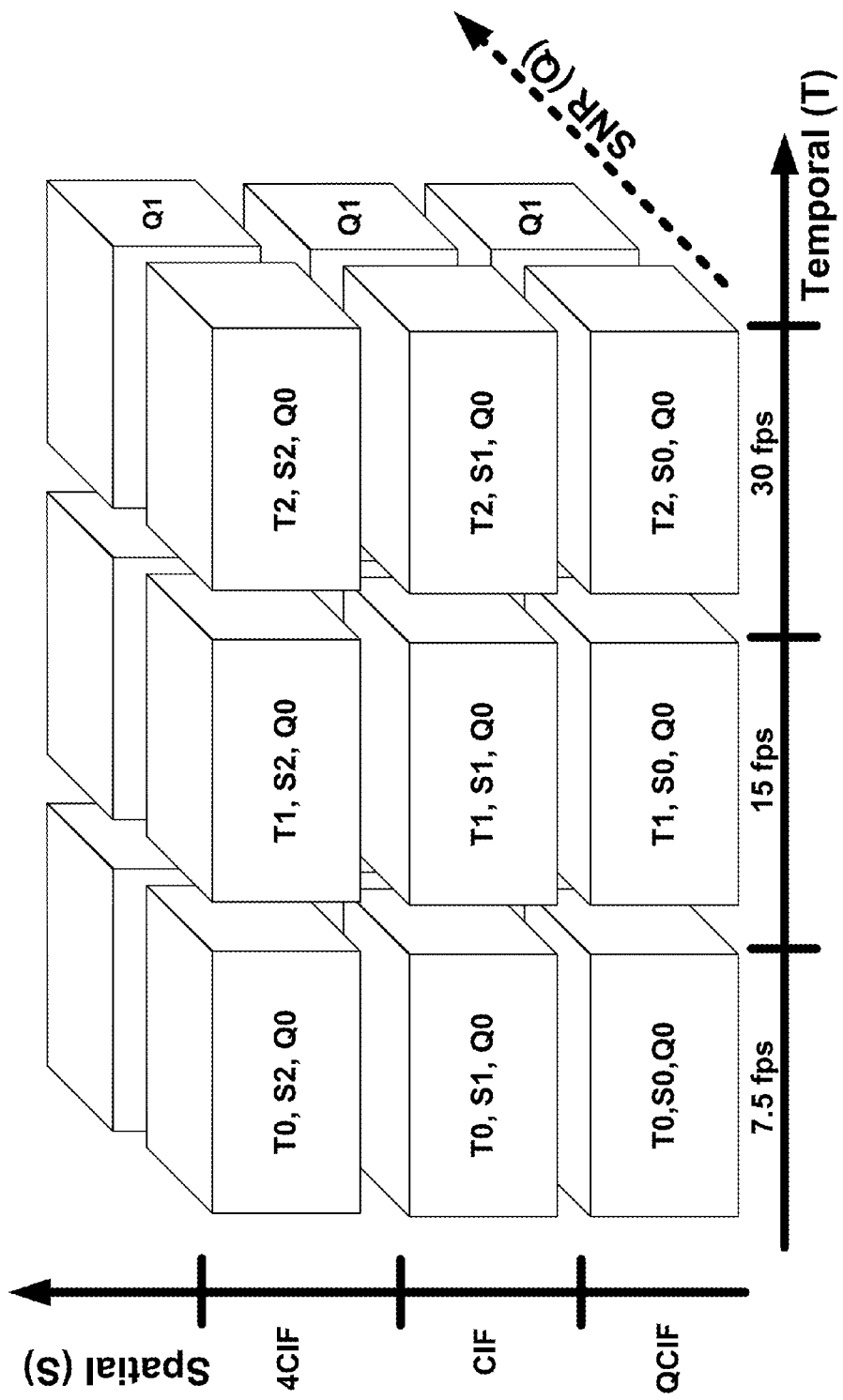
FIG. 8 is a conceptual diagram illustrating various scalable dimensions for scalable video coding (SVC).

FIG. 8 is a conceptual diagram illustrating various scalable dimensions for scalable video coding (SVC). In this example, scalabilities are enabled in three dimensions. In the time dimension, frame rates with 7.5 Hz, 15 Hz or 30 Hz can be supported by temporal scalability (T). When spatial scalability (S) is supported, different resolutions, such as QCIF, CIF, and 4CIF, may be enabled. For each specific spatial resolution and frame rate, signal-to-noise (SNR) (Q) layers can be added to improve the picture quality.

Once video content has been encoded in such a scalable way, an extractor tool may be used to adapt the actual delivered content according to application requirements, which may be dependent, e.g., on the clients or the transmission channel. In the example shown in FIG. 8, each cubic volume, i.e., cube, contains the pictures with the same frame rate (temporal level), spatial resolution and SNR layers. Better representation can be achieved by adding those cubes (pictures) in any dimension. Combined scalability may be supported when there are two, three or even more scalabilities enabled.

According to the SVC specification, the pictures with the lowest spatial and quality layer are compatible with H.264/AVC, and the pictures at the lowest temporal level form the temporal base layer, which can be enhanced with pictures at higher temporal levels. In addition to the H.264/AVC compatible layer, several spatial and/or SNR enhancement layers can be added to provide spatial and/or quality scalabilities. SNR scalability is also referred to as quality scalability. Each spatial or SNR enhancement layer itself may be temporally scalable, with the same temporal scalability structure as the H.264/AVC compatible layer. For one spatial or SNR enhancement layer, the lower layer it depends on is also referred to as the base layer of that specific spatial or SNR enhancement layer.

Figure 9:
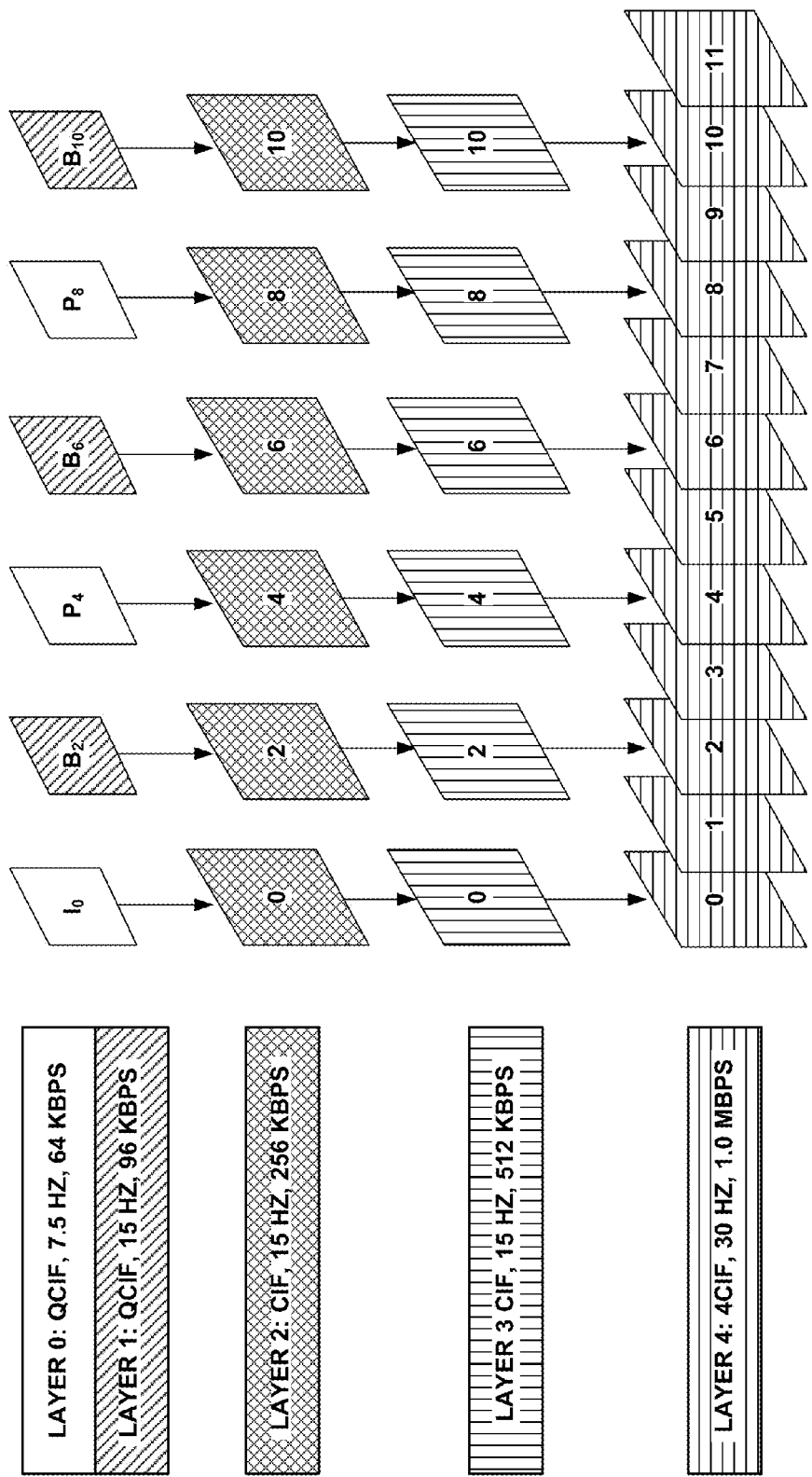
FIG. 9 is a conceptual diagram illustrating an example of the SVC coding structure.

FIG. 9 is a conceptual diagram illustrating an example of the SVC coding structure. In this example, the pictures with the lowest spatial and quality layer (pictures in layer 0 and layer 1, with QCIF resolution) are compatible with H.264/AVC. Among them, those pictures of the lowest temporal level form the temporal base layer, as shown in layer 0 of FIG. 9. This temporal base layer (layer 0) can be enhanced with pictures of higher temporal levels (layer 1). In addition to the H.264/AVC compatible layer, several spatial and/or SNR enhancement layers can be added to provide spatial and/or quality scalabilities. For instance, the enhancement layer can be a CIF representation with the same resolution as layer 2. In this example, layer 3 is a SNR enhancement layer. As shown in this example, each spatial or SNR enhancement layer itself may be temporally scalable, with the same temporal scalability structure as the H.264/AVC compatible layer. Also, an enhancement layer can enhance both spatial resolution and frame rate. For example, layer 4 provides a 4CIF enhancement layer, which further increases the frame rate from 15 Hz to 30 Hz.

Figure 10:
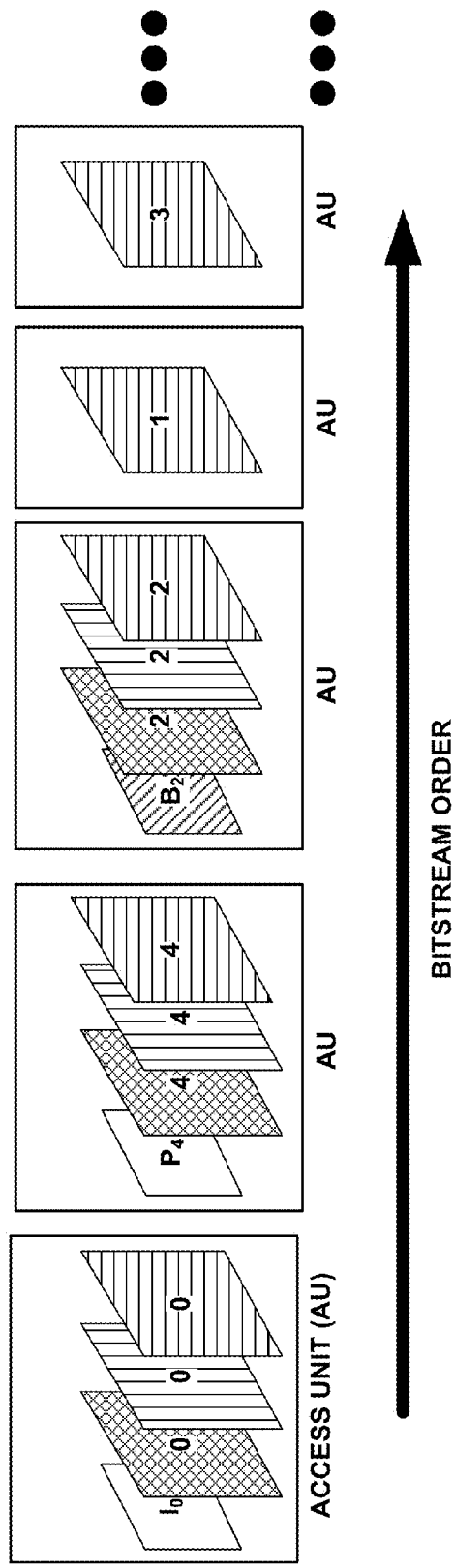
FIG. 10 is a conceptual diagram illustrating example access units (AUs) in a multi-layer bitstream.

FIG. 10 is a conceptual diagram illustrating example access units (AUs). Each AU includes one or more slices, encapsulated within network abstraction layer (NAL) units. There may be zero or more NAL units per access unit per layer. A set of NAL units corresponding to one layer within one AU may be referred to as a "layer component." The example of FIG. 10 portrays layer components corresponding to the layer components of FIG. 9. As shown in the example of FIG. 10, the coded slices in the same time instance (i.e., within a common AU) are successive in the bitstream order and form one access unit in the context of SVC. Those SVC access units then follow the decoding order, which could be different from the display order and decided, e.g., by the temporal prediction relationship.

Scalable extensions of H.264/AVC (Advanced Video Coding) are described below. Some functionalities of SVC are inherited from H.264/AVC. Compared with previous scalable standards, some of the greatest advantages of the SVC extension to H.264/AVC, namely inter-layer prediction and single-loop decoding, are reviewed below.

The SVC extension of H.264/AVC supports single loop decoding. With single-loop decoding, each supported layer can be decoded with a single motion compensation loop. To achieve this, the usage of inter-layer intra-prediction is only allowed for enhancement layer macro blocks, for which the collocated reference layer signal is intra-coded. It is further required that all layers that are used to inter-layer predict higher layers are coded using constrained intra-prediction.

The SVC extension of H.264/AVC also supports inter-layer prediction. SVC introduces inter-layer prediction for spatial and SNR scalabilities based on texture, residue and motion. Spatial scalability in SVC has been generalized to any resolution ratio between two layers. SNR scalability can be realized by Coarse Granularity Scalability (CGS) or Medium Granularity Scalability (MGS). In SVC, two spatial or CGS layers belong to different dependency layers (indicated by the syntax element dependency_id in NAL unit header), while two MGS layers can be in the same dependency layer. One dependency layer includes quality layers with the value of the syntax element quality_id from 0 to higher values, corresponding to quality enhancement layers. In SVC, inter-layer prediction methods are utilized to reduce inter-layer redundancy.

As noted above, similar to H.264/AVC, HEVC will also have scalable video coding extension, currently called SHVC, which will at least provide temporal scalability, SNR scalability and spatial scalability. In SHVC, to achieve inter-layer texture prediction, the reference layer reconstructed samples are first up-sampled when the resolution of the reference layer is lower than that of the enhancement layer. Even in the SNR scalability case, the reference layer samples may be filtered before being used for inter-layer prediction to obtain higher coding efficiency. The up-sampling or inter-layer filtering process may be performed for whole layer pictures, which may also be referred to as layer components or simply pictures. In SHVC, a multi-loop decoding structure may be used and a video decoder (such as video decoder 30) may process different layers in parallel.

According to aspects of this disclosure, video encoder 20 may encode data that indicates a tile configuration and/or a parallel processing configuration for layers of a multi-layer bitstream, such as the scalable layers shown in the examples of FIGS. 8-10. For example, video encoder 20 may encode data of a VPS and/or VPS VUI that indicates a tile configuration for layers of scalable video data shown in the examples of FIGS. 8-10. For example, video encoder 20 may encode data of a VPS and/or VPS VUI that indicates whether tiles, such as the tiles shown and described above with respect to FIG. 6, are enabled for a particular layer of scalable video data. Additionally or alternatively, video encoder 20 may encode data that indicates whether loop filtering across tiles is enabled or disabled. Video decoder 30 may be configured to decode such data, e.g., from a VPS and/or VPS VUI.

Additionally or alternatively, video encoder 20 may encode data of a VPS and/or VPS VUI that indicates a parallel processing configuration for layers of scalable video data, such as the layers shown in FIGS. 8-10. For example, video encoder 20 may encode data of a VPS and/or VPS VUI that indicates whether the synchronization described above with respect to FIGS. 4A-5, is enabled for pictures of a particular layer of scalable video data. Video decoder 30 may be configured to decode such data, e.g., from a VPS and/or VPS VUI.

Figure 11:
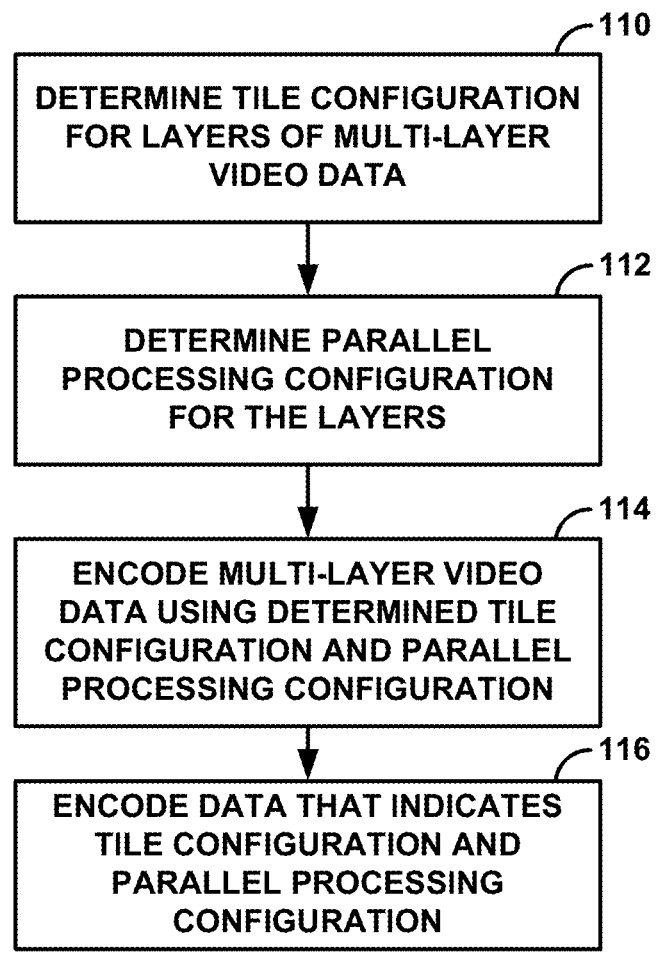
FIG. 11 illustrates a technique for processing multi-layer video data consistent with this disclosure.

FIG. 11 illustrates a technique for processing video data consistent with this disclosure. While described with respect to video encoder 20 (FIGS. 1 and 2) for purposes of example, the techniques of this disclosure may be performed using a variety of other processors. In addition, the particular process shown in FIG. 11 is provided for purposes of example. In other examples, a process consistent with the techniques of this disclosure may include more, fewer, or an alternative arrangement of steps.

Video encoder 20 may determine a tile configuration for layers of multi-layer video data (110). For example, video encoder 20 may determine whether to use tiles when encoding the layers of video data. Video encoder 20 may also determine whether to apply loop filters across tile boundaries when encoding the layers of video data. In some examples, video encoder 20 may determine whether to use tiles and whether to apply loop filters across tile boundaries based on a rate-distortion analysis.

Video encoder 20 may also determine a parallel processing configuration for coding the layers of video data (112). For example, video encoder 20 may determine whether to apply WPP, as well as the manner in which WPP is performed, as described in the examples above with respect to FIGS. 4A-5. Video encoder 20 may then encode the layers of the multi-layer video data using the determined tile configuration and parallel processing configuration (114). For example, video encoder 20 may perform intra- or inter-prediction of video data (including inter-layer prediction), as described above.

According to aspects of this disclosure, video encoder 20 may also encode data that indicates the tile configuration and the parallel processing configuration (116). For example, video encoder 20 may encode data of a VPS and/or VPS VUI that indicates a tile configuration for layers of the multi-layer bitstream and a parallel processing configuration for layers of the multi-layer bitstream. In an example for purposes of illustration, video encoder 20 may encode one or more syntax elements that indicate whether tiles are enabled in at least one picture in the layer (e.g., such as tiles_enabled_vps_flag[i] syntax element shown in the example of Table 1 above). In addition, for each layer for which tiles are enabled, video encoder 20 may also encode one or more syntax elements that indicate whether loop filtering is applied across tile boundaries, or whether loop filtering across tile boundaries is disabled (e.g., such as the loop_filter_across_tiles_disabled_vps_flag[i] syntax element shown in the example of Table 1 above). Video encoder 20 may also encode one or more syntax elements that indicate a parallel processing configuration. For example, video encoder 20 may encode one or more syntax elements that indicate whether entropy coding synchronization is performed, e.g., via WPP (e.g., such as the entropy_coding_sync_enabled_vps_flag[i] syntax element shown in the example of Table 1 above).

Figure 12:
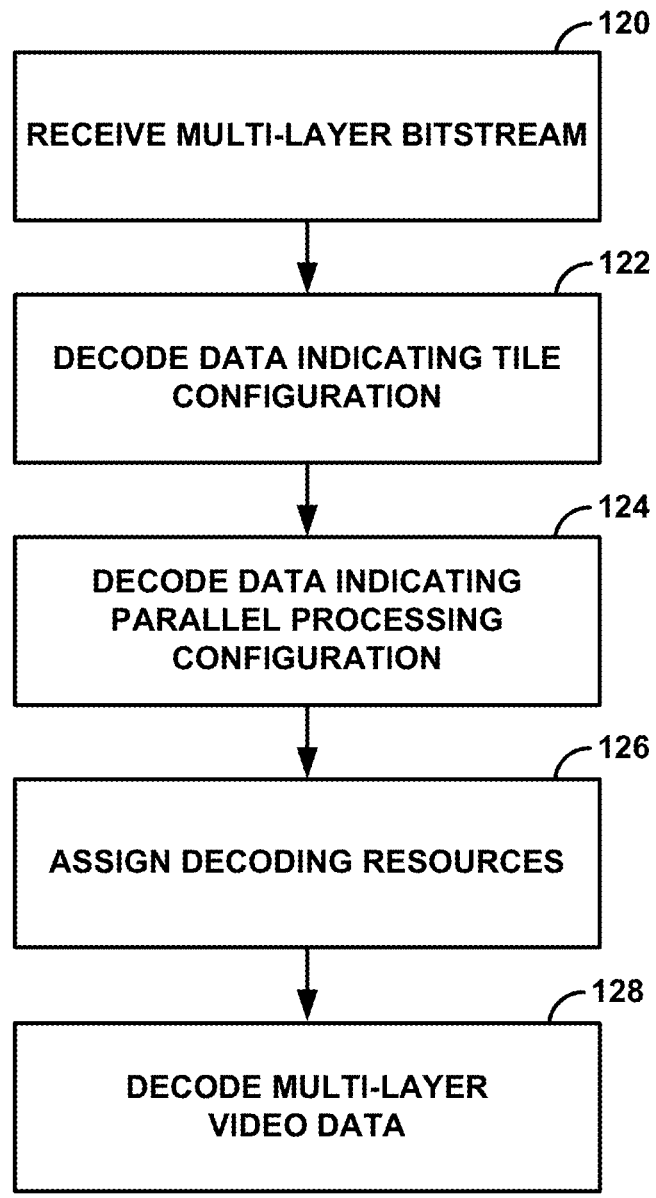
FIG. 12 illustrates another technique for processing multi-layer video data consistent with this disclosure.

FIG. 12 illustrates another technique for processing video data consistent with this disclosure. While described with respect to video decoder 30 (FIGS. 1 and 3) for purposes of example, the techniques of this disclosure may be performed using a variety of other processors. In addition, the particular process shown in FIG. 12 is provided for purposes of example. In other examples, a process consistent with the techniques of this disclosure may include more, fewer, or an alternative arrangement of steps.

Video decoder 30 may receive a multi-layer bitstream (120). For example, video decoder 30 may receive a bitstream that conforms to a particular video coding standard, such as the HEVC standard or its extensions (e.g., such as MV-HEVC, 3D-HEVC, SHVC, or the like).

According to aspects of this disclosure, video decoder 30 may decode data that indicates a tile configuration (122). Video decoder 30 may also decode data that indicates a parallel processing configuration (124). For example, video decoder 30 may decode data of a VPS and/or VPS VUI that indicates a tile configuration for the layers of the multi-layer bitstream and a parallel processing configuration for the layers of the multi-layer bitstream. In an example for purposes of illustration, video decoder 30 may decode one or more syntax elements that indicate whether tiles are enabled in at least one picture in the layer (e.g., such as tiles_enabled_vps_flag[i] syntax element shown in the example of Table 1 above). In addition, for each layer for which tiles are enabled, video decoder 30 may also decode one or more syntax elements that indicate whether loop filtering is applied across tile boundaries, or whether loop filtering across tile boundaries is disabled (e.g., such as the loop_filter_across_tiles_disabled_vps_flag[i] syntax element shown in the example of Table 1 above). In some instances, video decoder 30 may also decode one or more syntax elements that indicate a parallel processing configuration. For example, video decoder 30 may decode one or more syntax elements that indicate whether entropy coding synchronization is performed, e.g., via WPP (e.g., such as the entropy_coding_sync_enabled_vps_flag[i] syntax element shown in the example of Table 1 above).

In some instances, video decoder 30 may then assign decoding resources for decoding the multi-layer data (126). For example, according to aspects of this disclosure, the information described above may provide an early indication of the tile configuration and/or parallel processing configuration of video data, e.g., prior to decoding pictures of the video data. Video decoder 30 may assign particular tiles of video data (if enabled) to be decoded by particular processing cores. Video decoder 30 may, when assigning resources, consider whether loop filtering may be applied across tile boundaries. In addition, video decoder 30 may determine decoding resources based on the parallel processing configuration (e.g., WPP configuration) of pictures within a particular layer. Video decoder 30 may then decode the multi-layer video data, e.g., using a reciprocal process as applied by video encoder 20 (128).

Certain aspects of this disclosure have been described with respect to the HEVC standard and extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one example, video decoder 30 may be configured to parse one or more syntax elements corresponding to video data, wherein the one or more syntax elements indicate one or more of a tile configuration, a loop filter configuration, and a parallel processing configuration, and perform parallel decoding of the video data in accordance with the one or more syntax elements. Video decoder 30 may be configured to receive the one or more syntax element in a video parameter set.

In one example of the disclosure, the one or more syntax elements include a tiles_enabled_vps_flag that indicates the tile configuration for each picture parameter set referred to by at least one picture of the video data, a loop_filter_across_tiles_disabled_vps_flag that indicates the loop filter configuration for each picture parameter set referred to by at least one picture of the video data, and an entropy_coding_sync_enabled_vps_flag that indicates the parallel processing configuration for each picture parameter set referred to by at least one picture of the video data.

In another example of the disclosure, the one or more syntax elements include a parallel_tools_vps_idc syntax element, the parallel_tools_vps_idc syntax element indicating both the tile configuration and the parallel processing configuration for each layer of the video data referring to the video parameter set.

In another example of the disclosure, the one or more syntax elements include a parallel_tools_vps_idc syntax element, the parallel_tools_vps_idc syntax element indicating both the tile configuration and the parallel processing configuration for each picture parameter set referred to by at least one picture of the video data.

In another example of the disclosure, the one or more syntax elements include a tile_entropy_sync_coding_not_mixed_flag and a loopfilter_across_tile_boundary_not_mixed flag, wherein the tile_entropy_sync_coding_not_mixed_flag indicates the tile configuration and the parallel processing configuration for each picture parameter set referred to by at least one picture of the video data, and wherein the loopfilter_across_tile_boundary_not_mixed_flag indicates the loop filter configuration for each picture parameter set referred to by at least one picture of the video data.

In another example of the disclosure, video encoder 20 may be configured to determine one or more syntax elements corresponding to video data, wherein the one or more syntax elements indicate one or more of a tile configuration, a loop filter configuration, and a parallel processing configuration, perform parallel encoding of the video data in accordance with the one or more syntax elements, and signal the one or more syntax elements. Video encoder 20 may signal the one or more syntax element in a video parameter set.

In one example of the disclosure, the one or more syntax elements include a tiles_enabled_vps_flag that indicates the tile configuration for each picture parameter set referred to by at least one picture of the video data, a loop_filter_across_tiles_disabled_vps_flag that indicates the loop filter configuration for each picture parameter set referred to by at least one picture of the video data, and an entropy_coding_sync_enabled_vps_flag that indicates the parallel processing configuration for each picture parameter set referred to by at least one picture of the video data.

In another example of the disclosure, the one or more syntax elements include a parallel_tools_vps_idc syntax element, the parallel_tools_vps_idc syntax element indicating both the tile configuration and the parallel processing configuration for each layer of the video data referring to the video parameter set.

In another example of the disclosure, the one or more syntax elements include a parallel_tools_vps_idc syntax element, the parallel_tools_vps_idc syntax element indicating both the tile configuration and the parallel processing configuration for each picture parameter set referred to by at least one picture of the video data.

In another example of the disclosure, the one or more syntax elements include a tile_entropy_sync_coding_not_mixed_flag and a loopfilter_across_tile_boundary_not_mixed flag, wherein the tile_entropy_sync_coding_not_mixed_flag indicates the tile configuration and the parallel processing configuration for each picture parameter set referred to by at least one picture of the video data, and wherein the loopfilter_across_tile_boundary_not_mixed_flag indicates the loop filter configuration for each picture parameter set referred to by at least one picture of the video data.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   decoding, from a video parameter set (VPS) of a multi-layer bitstream, data that indicates tile configuration for at least one layer of the multi-layer bitstream, wherein decoding the data that indicates the tile configuration comprises decoding, for the at least one layer of the multi-layer bitstream, a syntax element that indicates, for the at least one layer, a value of a second syntax element is equal to 1 for each picture parameter set (PPS) that is referred to by at least one picture of the at least one layer specified by the VPS, the second syntax element having a value of 1 specifying that there is more than one tile in each picture referring to a respective PPS; and
   decoding the multi-layer bitstream in accordance with the data decoded from the VPS.

2. The method of claim 1, further comprising decoding data that indicates a parallel processing configuration for the at least one layer of the multi-layer bitstream.

3. The method of claim 2, wherein decoding the data that indicates the parallel processing configuration comprises decoding data that indicates whether entropy coding synchronization is performed for the at least one layer of the multi-layer bitstream.

4. The method of claim 3, wherein decoding the data that indicates the parallel processing configuration further comprises decoding an entropy_coding_sync_enabled_vps_flag syntax element that indicates the parallel processing configuration for each picture parameter set referred to by at least one picture of at least one layer.

5. The method of claim 1, wherein decoding the data that indicates the tile configuration further comprises decoding a tiles_enabled_vps_flag syntax element that indicates the tile configuration for each picture parameter set referred to by at least one picture of the at least one layer.

6. The method of claim 5, wherein decoding the data that indicates the tile configuration further comprises decoding a loop_filter_across_tiles_disabled_vps_flag syntax element that indicates a loop filter configuration for each picture parameter set referred to by at least one picture of the at least one layer.

7. The method of claim 1, wherein the data that indicates the tile configuration includes a parallel_tools_vps_idc syntax element, and wherein the parallel_tools_vps_idc syntax element indicates both the tile configuration and a parallel processing configuration for the at least one layer of the multi-layer bitstream.

8. The method of claim 1, wherein the data that indicates the tile configuration includes a tile_entropy_sync_coding_not_mixed_flag syntax element that indicates the tile configuration and a parallel processing configuration for the at least one layer, the method further comprising decoding a loopfilter_across_tile_boundary_not_mixed_flag syntax element that indicates a loop filter configuration for the at least one layer of video data.

9. The method of claim 1, further comprising assigning decoding resources of a video decoder based on the data decoded from the VPS.

10. The method of claim 1, wherein decoding the VPS comprises decoding the VPS prior to a sequence of pictures of the multi-layer bitstream, and wherein decoding the multi-layer bitstream comprises decoding the sequence of pictures in accordance with the data decoded from the VPS.

11. A method of encoding video data, the method comprising:
    encoding, in a video parameter set (VPS) of a multi-layer bitstream, data that indicates at at least one of a tile configuration for at least one layer of the multi-layer bitstream, wherein encoding the data that indicates the tile configuration comprises decoding, for the at least one layer of the multi-layer bitstream, a syntax element that indicates, for the at least one layer, a value of a second syntax element is equal to 1 for each picture parameter set (PPS) that is referred to by at least one picture of the at least one layer specified by the VPS, the second syntax element having a value of 1 specifying that there is more than one tile in each picture referring to a respective PPS; and
    encoding the multi-layer bitstream including encoding the VPS of the multi-layer bitstream.

12. The method of claim 11, further comprising encoding data that indicates a parallel processing configuration for the at least one layer of the multi-layer bitstream.

13. The method of claim 12, wherein encoding the data that indicates the parallel processing configuration comprises encoding data that indicates whether entropy coding synchronization is performed for the at least one layer of the multi-layer bitstream.

14. The method of claim 13, wherein encoding the data that indicates the parallel processing configuration further comprises encoding an entropy_coding_sync_enabled_vps_flag syntax element that indicates the parallel processing configuration for each picture parameter set referred to by at least one picture of the at least one layer.

15. The method of claim 11, wherein encoding the data that indicates the tile configuration further comprises encoding a tiles_enabled_vps_flag syntax element that indicates the tile configuration for each picture parameter set referred to by at least one picture of the at least one layer.

16. The method of claim 15, wherein encoding the data that indicates the tile configuration further comprises encoding a loop_filter_across_tiles_disabled_vps_flag syntax element that indicates a loop filter configuration for each picture parameter set referred to by at least one picture of the at least one layer.

17. The method of claim 11, wherein the data that indicates the tile configuration includes a parallel_tools_vps_idc syntax element, wherein the parallel_tools_vps_idc syntax element indicates both the tile configuration and a parallel processing configuration for the at least one layer of the multi-layer bitstream.

18. The method of claim 11, wherein the data that indicates the tile configuration includes a tile_entropy_sync_coding_not_mixed_flag syntax element that indicates the tile configuration and a parallel processing configuration for the at least one layer of multi-layer bitstream, the method further comprising encoding a loopfilter_across_tile_boundary_not_mixed_flag syntax element that indicates a loop filter configuration for each layer of the multi-layer bitstream.

19. The method of claim 11, further comprising assigning encoding resources of a video encoder in accordance with the data of the VPS.

20. The method of claim 11, wherein encoding the VPS comprises encoding the VPS prior to encoding a sequence of pictures of the multi-layer bitstream, and wherein encoding the multi-layer bitstream comprises encoding the sequence of pictures.

21. An apparatus that processes video data, the apparatus comprising:
   a memory storing multi-layer video data; and
   a video coder in communication with the memory, the video coder being configured to:
      process data that indicates tile configuration for at least one layer of the multi-layer video data stored to the memory, wherein the data is associated with a video parameter set (VPS) of a bitstream that includes the multi-layer video data, wherein the data that indicates the tile configuration comprises data that indicates, for the at least one layer of the multi-layer bitstream, a syntax element that indicates, for the at least one layer, a value of a second syntax element is equal to 1 for each picture parameter set (PPS) that is referred to by at least one picture of the at least one layer specified by the VPS, the second syntax element having a value of 1 specifying that there is more than one tile in each picture referring to a respective PPS; and
      process the multi-layer video data in accordance with the data of the VPS.

22. The apparatus of claim 21, wherein the video coder is further configured to process data that indicates a parallel processing configuration for the at least one layer of the multi-layer video data.

23. The apparatus of claim 22, wherein to process the data that indicates the parallel processing configuration, the video coder is configured to process data that indicates whether entropy coding synchronization is performed for the at least one layer of the multi-layer video data.

24. The apparatus of claim 23, wherein to process the data that indicates the parallel processing configuration, the video coder is further configured to process an entropy_coding_sync_enabled_vps_flag syntax element that indicates the parallel processing configuration for each picture parameter set referred to by at least one picture of the at least one layer.

25. The apparatus of claim 21, wherein to process the data that indicates the tile configuration, the video coder is further configured to process a tiles_enabled_vps_flag syntax element that indicates the tile configuration for each picture parameter set referred to by at least one picture of the at least one layer.

26. The apparatus of claim 25, wherein to process the data that indicates the tile configuration, the video coder is further configured to process a loop_filter_across_tiles_disabled_vps_flag syntax element that indicates a loop filter configuration for each picture parameter set referred to by at least one picture of the at least one layer.

27. The apparatus of claim 21, wherein to process the video data, the video coder is configured to encode the video data, and wherein to encode the video data, the video coder is configured to:
   determine residual video data for at least one layer of the multi-layer video data;
   transform the residual data; and
   encode data representing the transformed residual data in the bitstream.

28. The apparatus of claim 21, wherein to process the video data, the video coder is configured to decode the video data, and wherein to decode the video data, the video coder is configured to:
   parse the VPS of the bitstream;
   parse, after parsing the VPS and from the bitstream, data representing residual video data for the at least one layer of the multi-layer bitstream;
   inverse transform the residual data; and
   reconstruct the at least one layer of video data based on the inverse transformed residual data.

29. The apparatus of claim 21, further comprising a display device configured to present the at least one layer of the multi-layer video data for display.

30. The apparatus of claim 21, further comprising a wireless modem configured to receive the multi-layer video data.

31. The apparatus of claim 21, wherein the apparatus comprises at least one of:
   one or more integrated circuits;
   one or more microprocessors;
   one or more digital signal processors (DSPs);
   one or more field programmable gate arrays (FPGAs);
   a desktop computer;
   a laptop computer;
   a tablet computer;
   a phone;
   a television;
   a camera;
   a display device;
   a digital media player;
   a video game console;
   a video game device;
   a video streaming device; or
   a wireless communication device.

32. An apparatus that processes video data, the apparatus comprising:
   means for processing data that indicates tile configuration for at least one layer of the multi-layer bitstream, wherein the data is associated with a video parameter set (VPS) of the multi-layer bitstream, wherein the data that indicates the tile configuration comprises data that indicates, for the at least one layer of the multi-layer bitstream, a syntax element that indicates, for the at least one layer, a value of a second syntax element is equal to 1 for each picture parameter set (PPS) that is referred to by at least one picture of the at least one layer specified by the VPS, the second syntax element having a value of 1 specifying that there is more than one tile in each picture referring to a respective PPS; and
   means for processing the multi-layer bitstream in accordance with the data of the VPS.

33. The apparatus of claim 32, further comprising means for processing data that indicates a parallel processing configuration for the at least one layer of the multi-layer bitstream.

34. The apparatus of claim 33, wherein the means for processing the data that indicates the parallel processing configuration comprises means for processing data that indicates whether entropy coding synchronization is performed for the respective layer of the multi-layer bitstream.

35. The apparatus of claim 34, wherein the means for processing the data that indicates the parallel processing configuration further comprises means for processing an entropy_coding_sync_enabled_vps_flag syntax element that indicates the parallel processing configuration for each picture parameter set referred to by at least one picture of the at least one layer.

36. The apparatus of claim 32, wherein the means for processing the data that indicates the tile configuration further comprises a means for processing a tiles_enabled_vps_flag syntax element that indicates the tile configuration for each picture parameter set referred to by at least one picture of the at least one layer.

37. The apparatus of claim 36, wherein the means for processing the data that indicates the tile configuration further comprises means for processing a loop_filter_across_tiles_disabled_vps_flag syntax element that indicates a loop filter configuration for each picture parameter set referred to by at least one picture of the at least one layer.

38. The apparatus of claim 32, wherein the apparatus comprises at least one of:
one or more integrated circuits;
one or more microprocessors;
one or more digital signal processors (DSPs);
one or more field programmable gate arrays (FPGAs);
a desktop computer;
a laptop computer;
a tablet computer;
a phone;
a television;
a camera;
a display device;
a digital media player;
a video game console;
a video game device;
a video streaming device; or
a wireless communication device.

39. A non-transitory computer-readable storage medium having instructions stored thereon that, when executed, cause one or more processors to:
process data that indicates at least one of a tile configuration for at least one layer of a multi-layer bitstream, wherein the data is associated with a video parameter set (VPS) of the multi-layer bitstream, wherein the data that indicates the tile configuration comprises data that indicates, for the at least one layer of the multi-layer bitstream, a syntax element that indicates, for the at least one layer, a value of a second syntax element is equal to 1 for each picture parameter set (PPS) that is referred to by at least one picture of the at least one layer specified by the VPS, the second syntax element having a value of 1 specifying that there is more than one tile in each picture referring to a respective PPS; and
process the multi-layer bitstream in accordance with the data of the VPS.

40. The non-transitory computer-readable storage medium of claim 39, further having instructions thereon that cause the one or more processors to process data that indicates a parallel processing configuration for the at least one layer of the multi-layer bitstream.

41. The non-transitory computer-readable storage medium of claim 39, wherein to process the data that indicates the tile configuration, the instructions further cause the one or more processors to process a tiles_enabled_vps_flag syntax element that indicates the tile configuration for each picture parameter set referred to by at least one picture of the at least one layer.

42. The non-transitory computer-readable storage medium of claim 41, wherein to process the data that indicates the tile configuration, the instructions further cause the one or more processors to process a loop_filter_across_tiles_disabled_vps_flag syntax element that indicates a loop filter configuration for each picture parameter set referred to by at least one picture of the at least one layer.

43. The non-transitory computer-readable storage medium of claim 39, wherein to process the data that indicates the parallel processing configuration, the instructions cause the one or more processors to process data that indicates whether entropy coding synchronization is performed for the at least one layer of the multi-layer bitstream.

44. The non-transitory computer-readable storage medium of claim 43, wherein to process the data that indicates the parallel processing configuration, the instructions further cause the one or more processors to process an entropy_coding_sync_enabled_vps_flag syntax element that indicates the parallel processing configuration for each picture parameter set referred to by at least one picture of the at least one layer.

* * * * *